United States Patent [19]

Shudo et al.

[11] Patent Number: 5,448,540
[45] Date of Patent: Sep. 5, 1995

[54] DEVICE FOR DETECTING THE POSITION OF A RECORDING/REPRODUCING ELEMENT

[75] Inventors: Katsuyuki Shudo, Yokosuka; Hisao Kinjo, Yokohama; Yoshio Mizuno, Kamakura; Ryo Nishima, Yokosuka; Shigeru Kawase, Tokyo, all of Japan

[73] Assignee: Victor Company of Japan, Ltd., Yokohama, Japan

[21] Appl. No.: 200,863

[22] Filed: Feb. 22, 1994

Related U.S. Application Data

[63] Continuation of Ser. No. 762,979, Sep. 20, 1991, abandoned.

[30] Foreign Application Priority Data

| Sep. 21, 1990 | [JP] | Japan | 2-253034 |
| May 30, 1991 | [JP] | Japan | 3-155771 |
| Jul. 8, 1991 | [JP] | Japan | 3-060934 U |

[51] Int. Cl.6 .............................................. G11B 7/00
[52] U.S. Cl. ................................. 369/44.14; 369/121; 369/44.32; 369/44.41
[58] Field of Search ............... 369/44.11, 44.12, 44.14, 369/44.15, 44.21, 44.32, 32, 112, 44.16, 121, 14.25, 44.28, 44.41; 360/59, 60, 77.01

[56] References Cited

U.S. PATENT DOCUMENTS

| 4,764,911 | 8/1988 | Morota et al. | 369/44.16 |
| 4,943,166 | 7/1990 | Yamashita | 369/32 |
| 5,039,202 | 8/1991 | Koyama et al. | 369/44.11 |
| 5,078,471 | 1/1992 | Takishima | 369/44.16 |
| 5,079,663 | 1/1992 | Ju et al. | 360/77.01 |
| 5,083,301 | 1/1992 | Matoba et al. | 369/44.28 |
| 5,177,718 | 1/1993 | Takeuchi | 369/44.25 |
| 5,182,739 | 1/1993 | Kime et al. | 369/44.14 |
| 5,189,653 | 2/1993 | Yanagi | 369/44.32 |
| 5,216,648 | 6/1993 | Noda et al. | 369/121 |

FOREIGN PATENT DOCUMENTS 52-117105 10/1977 Japan .
2-172013 7/1990 Japan .

Primary Examiner—Georgia Y. Epps
Assistant Examiner—Nabil Hindi
Attorney, Agent, or Firm—Lowe, Price, LeBlanc & Becker

[57] ABSTRACT

A device for detecting the position of a recording/reproducing element, which is provided with two position detecting elements having the same input/output characteristics and a device for generating a difference signal representing the difference between output signals of the two position detecting elements. Further, the outputs of the position detecting elements vary correspondingly to change in position of the recording/reproducing element in such a manner to be complementary to each other.

5 Claims, 12 Drawing Sheets

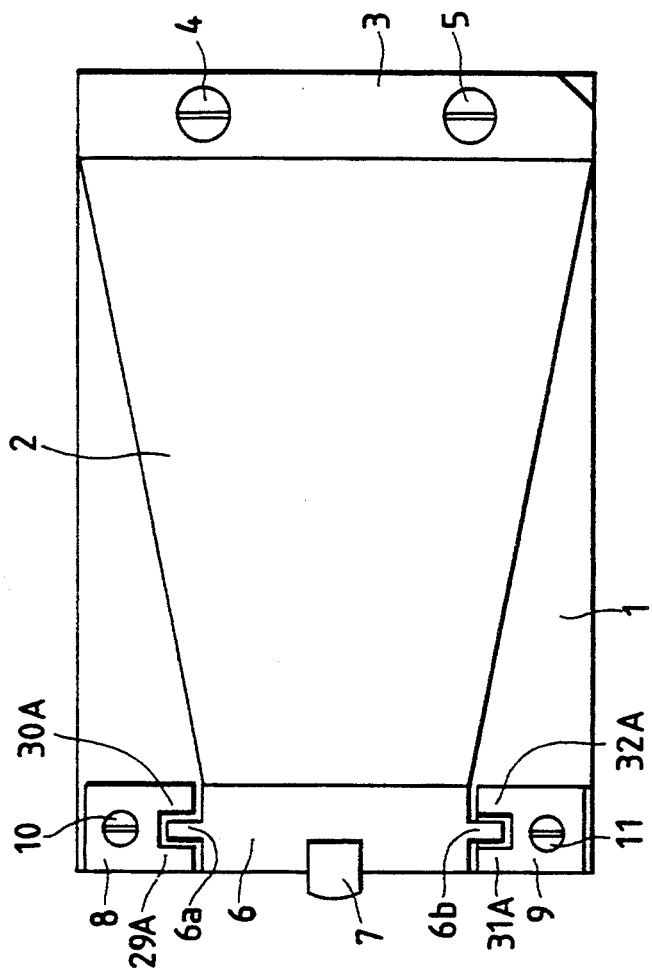
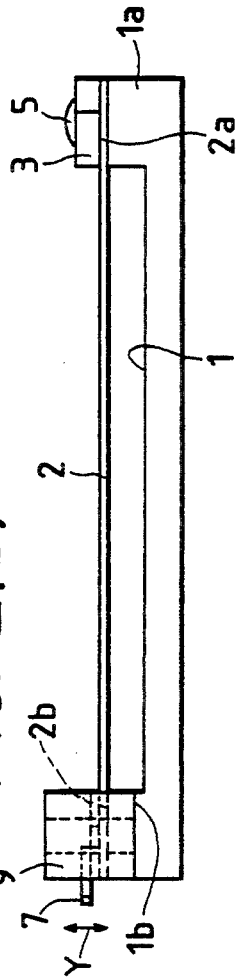
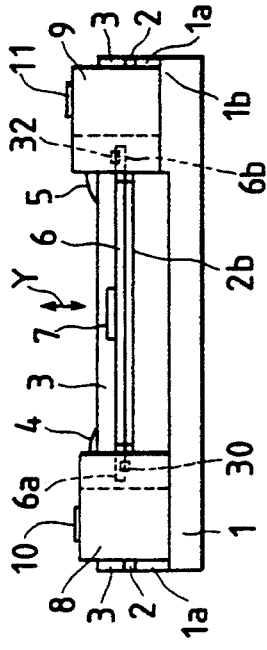
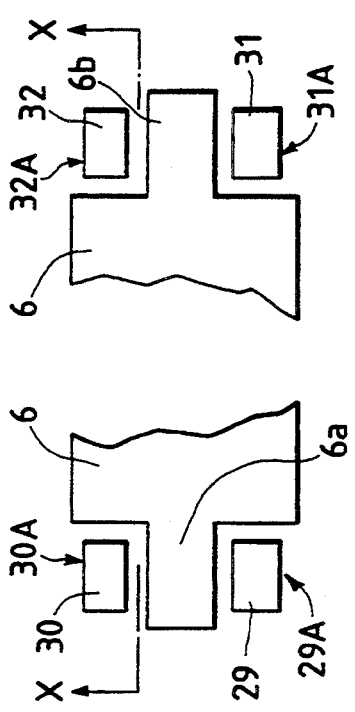
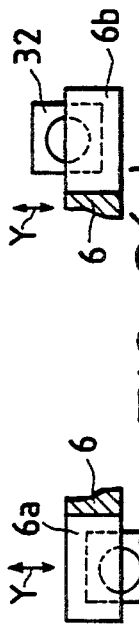

FIG. 3
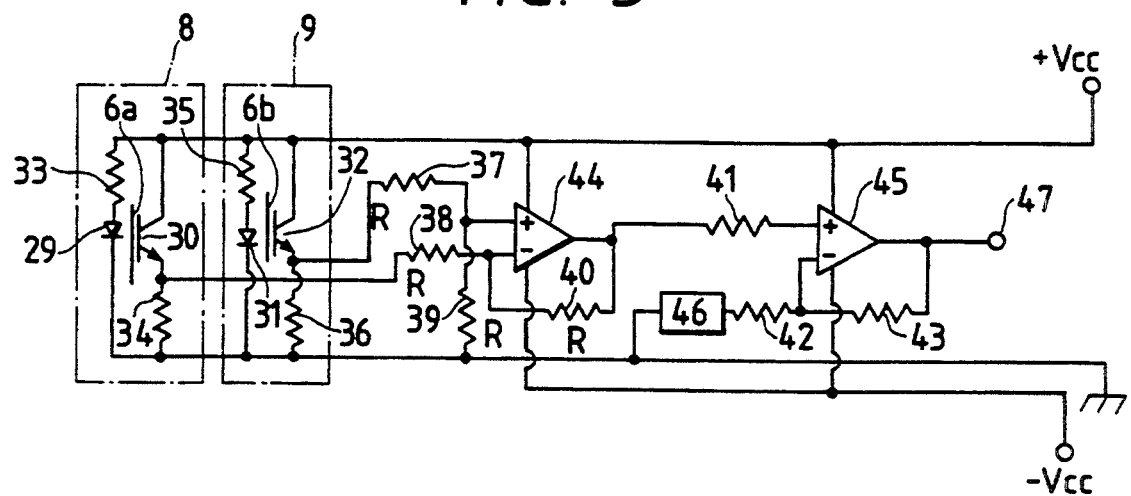
FIG. 5(a)
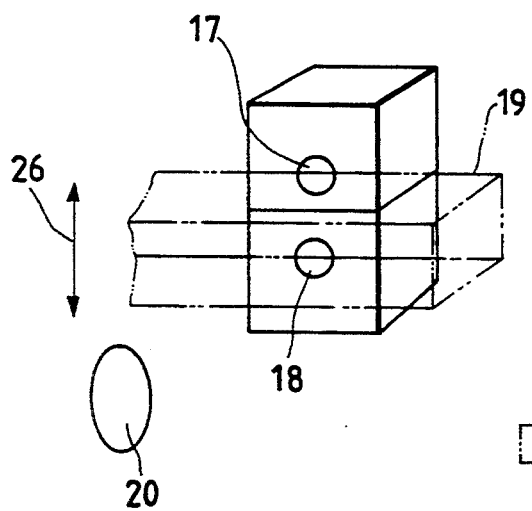
FIG. 5(b)
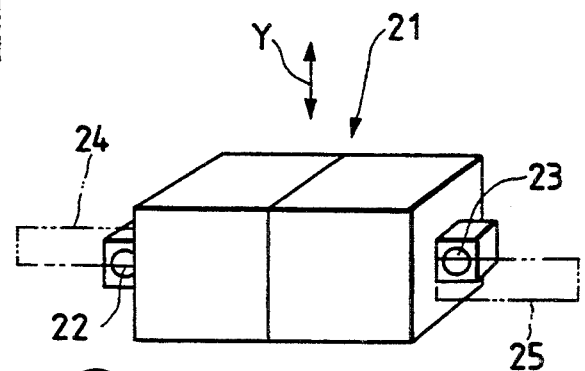
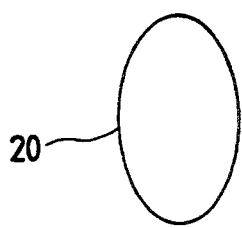

FIG. 9(b)
FIG. 9(a)
FIG. 9(c)
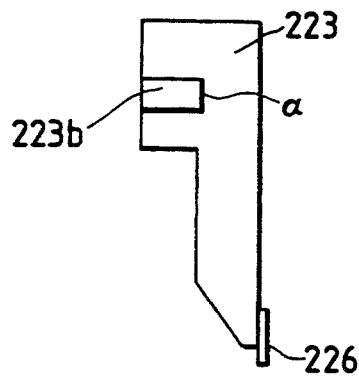
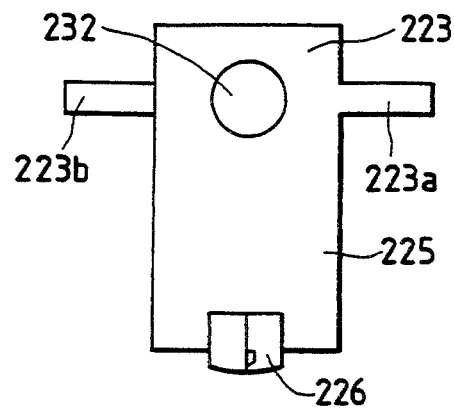
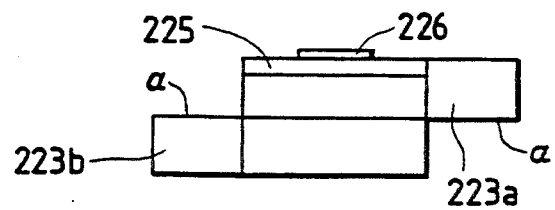
FIG. 10(b)
FIG. 10(a)
FIG. 10(c)
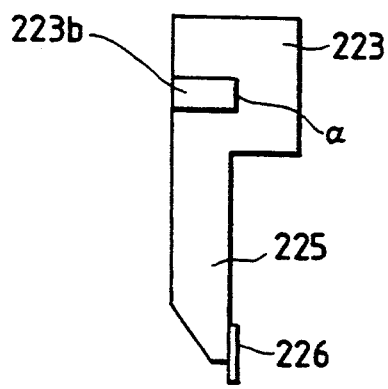
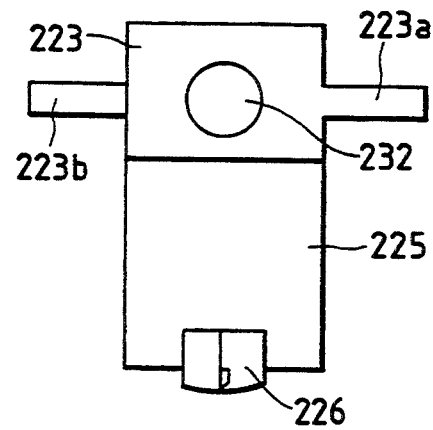
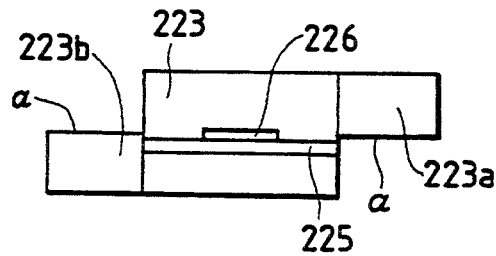

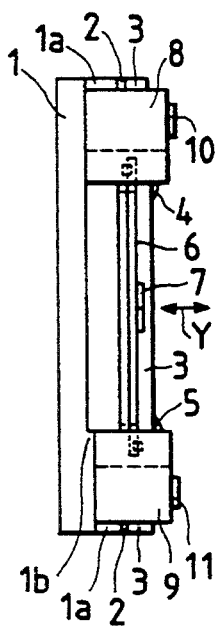
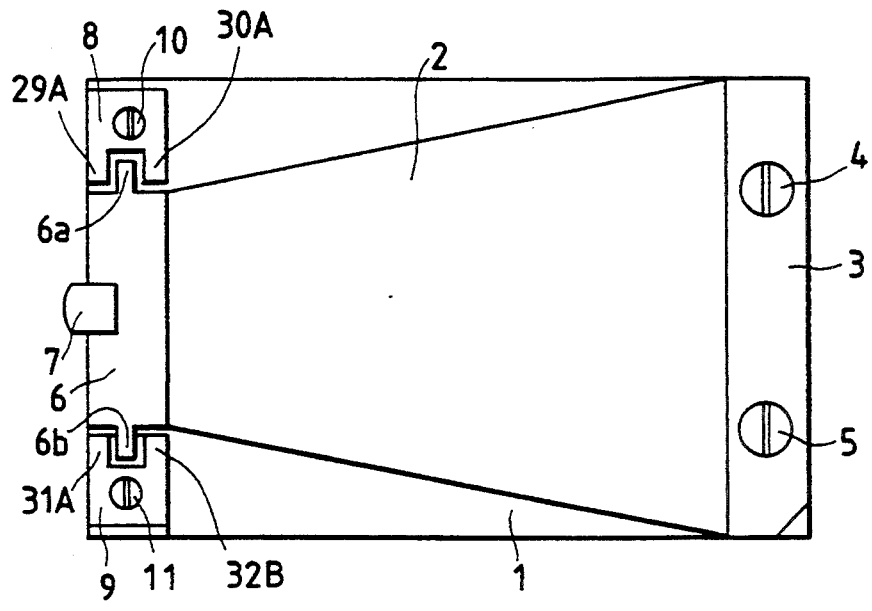
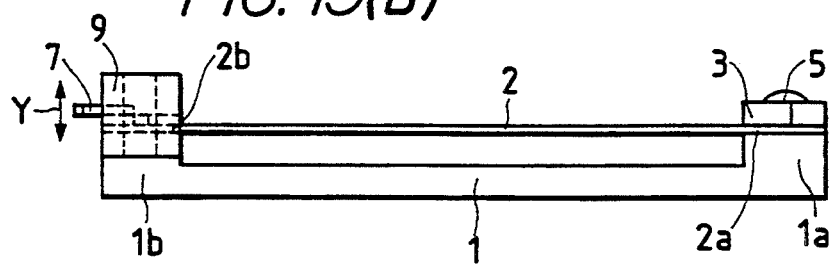
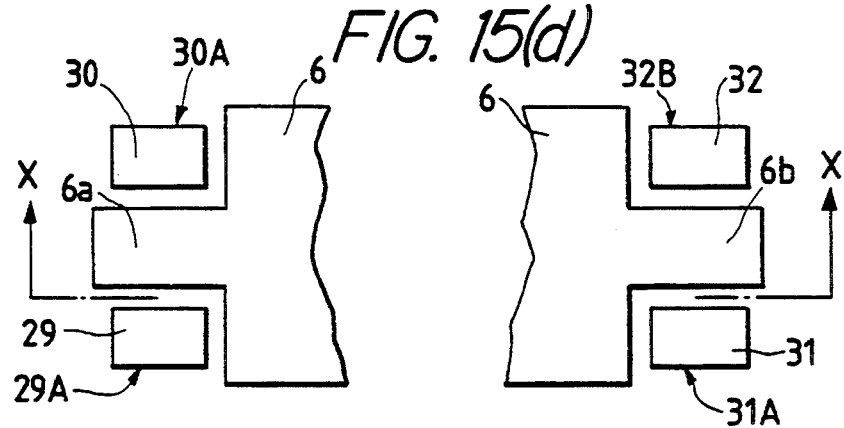
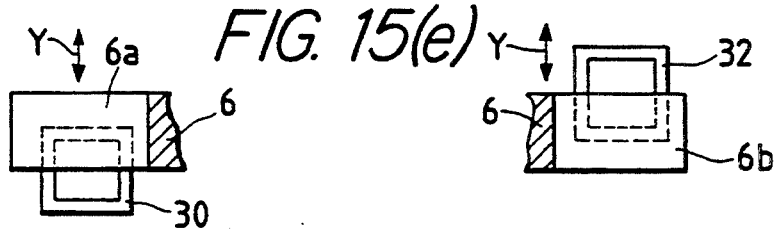

DEVICE FOR DETECTING THE POSITION OF A RECORDING/REPRODUCING ELEMENT

This application is a continuation of application Ser. No. 07/762,979 filed Sept. 20, 1991, now abandoned.

BACKGROUND OF THE INVENTION

1. Field of The Invention

This invention relates to a device for detecting a recording/reproducing element.

2. Description of The Related Art

As an example of a typical magnetic recording/reproducing apparatus adapted to record on and reproduce from a magnetic tape an information signal by using magnetic rotating heads (hereunder sometimes referred to simply as a rotating heads), a video tape recorder (VTR) can be cited. Further, it is well known that rapid progress to date has provided current VTRs with excellent picture quality and advanced functions. Moreover, earnest work is now in progress to develop a digital VTR which is used to record digital signals.

Further, the VTR of the above described type (namely, the VTR adapted to record on and reproduce from a magnetic tape an information signal by using rotating heads) is generally used to record continuous images such as a television broadcast programme and a video picture taken by using a television camera. Recently, in view of the fact that a magnetic tape used in a VTR has large storage capacity, it has come to make an attempt to use a VTR as a composing member (for example, a storage device) of a digital information processing system.

Furthermore, in case where such a VTR is used as a composing member of a digital information processing system, for example, an external auxiliary storage device for a computer system or as a device for sequentially recording images produced by using computer graphics techniques upon completion of calculation of data representing the images and for generating an animation by continuously reproducing the recorded images, the recording of information signals is sometimes performed in such a manner that the information signals is recorded on a magnetic tape in track units or in several tracks. Therefore, for the purpose of employing such a VTR as a composing member of an information processing system, it is necessary to achieve an operation of recording information on a magnetic tape, for instance, in track units or in several tracks in a highly stable and reliable manner.

In case that an information signal is recorded on a specific track in a magnetic tape or the contents of a record on a specific track in the magnetic tape are modified in a VTR of the type in which records on and reproduces from the magnetic tape an information signal by using rotating heads, the following conventional methods for recording the information signal on the magnetic tape are performed. Namely, in case of performing a first conventional method, the magnetic tape is preliminarily rewound by effecting a pre-rolling operation in such a manner that a position prior to a predetermined starting position, from which the recording of an information signal should be started, on the magnetic tape is adjusted to the rotating head. When starting the recording of the information signal, the magnetic tape is rapidly moved forward therefrom, so that the starting position on the magnetic tape passes through the rotating head at a predetermined tape transporting speed and thus the information signal is recorded on a predetermined number of tracks from the starting position on the magnetic tape. In contrast, in case of performing a second conventional method, a portion, on which an information signal should be recorded, of a magnetic tape is first stopped at a place, at which the recording of the information signal is performed, of a VTR by using a control pulse and controlling the position of a capstan motor. Then, the information signal is recorded by using a rotating head on the portion of the magnetic tape which is at a standstill.

The above described first conventional method is performed in what is called an assembly recording mode (i.e., in an electronic splicing mode) and in what is called an insert-type recording mode (i.e., in an insert-type electronic editing mode) of an electronic editing of a record in a conventional VTR. This method, however, is not suited for a case in which the above described recording operation is frequently performed. This is because the first conventional method requires the repetition of steps of rewinding a magnetic tape and transporting the tape forward every time an information signal is recorded on a magnetic tape so as to charge a large burden against and waste a tape transport mechanism of the VTR and the magnetic tape. Moreover, the conventional VTR has another drawback that it is difficult to set the position of a track with high precision because of the fact that the position of a track on which an information signal should be recorded is determined by a relative motion of a rotating head of the VTR with respect to the magnetic tape which is running. Furthermore, the conventional VTR has still another drawback that the pre-rolling operation takes time and thus a time interval between two consecutive recording operations cannot be decreased to a desirable extent.

In contrast, the above described second conventional method does not require the rewinding operation as required in the first conventional method. Further, in case of employing the second conventional method, a recording operation is performed while a magnetic tape is at a standstill. Thus the second conventional method has advantages that there is no case in which a large burden is charged against the tape transport mechanism and the magnetic tape and that the position of a track can be easily set with high precision. However, as described above, an information signal is recorded by using a rotating head on a magnetic tape which is stationary. This results in that the pattern of records formed in a track on a magnetic tape by effecting the second conventional method becomes different from that of records formed in a track on a magnetic tape, which runs at a predetermined speed, correspondingly to the locus of the rotation of a magnetic rotating head. Therefore, when the information represented by the information signal recorded on the magnetic tape by performing the second conventional method is reproduced in a state in which the magnetic tape is running at a predetermined running speed, the track cannot be exactly tracked by the rotating head. Further, it is difficult to record information on tracks, a part of which are formed on a magnetic tape by effecting the second conventional method and mixed with the other tracks formed on the same magnetic tape moving at a predetermined running speed, and to use the recorded information.

For the purpose of eliminating the drawbacks of the first and second conventional methods, has been proposed a VTR provided with an actuator for controlling the locus of the rotation of a magnetic rotating head at the time of intermittently performing recording operations on the basis of a position signal generated correspondingly to an absolute position of the rotating head, which is measured by using a reference edge of the magnetic tape as a reference position, in such a manner that a record of an information signal similar to, for example, another record thereof formed on the magnetic tape, which moves at a predetermined running speed in a predetermined direction, correspondingly to the locus of the rotation of the rotating head is formed according to the locus of the rotating head with respect to the magnetic tape which stops after intermittently moves by a predetermined distance at a time in the running direction.

Further, a VTR provided with such an actuator needs to stably detect the exact position of the rotating head. For example, Japanese Patent Application Provisional Publication No. 52-117105 discloses a VTR (hereunder sometimes referred to as a first conventional VTR) having such an actuator composed of an electro-mechanical transducing element formed by using an electrostrictive material, which is adapted to detect the displacement of the actuator by employing a strain gauge adhering to the electro-mechanical transducing element formed from the electrostrictive material.

Although the first conventional VTR can suppress the free oscillation of the actuator by first generating a speed signal representing the speed of the actuator by differentiating the displacement of the actuator and then feeding back the speed signal to a drive circuit, the first conventional VTR cannot detect the position of the rotating head.

This is because a VTR adapted to detect a quantity of an warp or distortion of an electrostrictive material composing an electro-mechanical transducing element like the first conventional VTR cannot detect the position of a rotating head on the basis of the detected quantity of the warp of the electrostrictive material owing to the facts that the quantity of the warp or distortion of the electrostrictive material indicates a hysteresis characteristic and that the state of the warp of the electrostrictive changes according to temperature.

The present invention is created to eliminate the drawbacks of the conventional VTRs.

It is, therefore, a first object of the present invention to provide a device for detecting the position of a recording/reproducing element of a VTR, which can improve the precision of the detection of the recording/reproducing element and completely eliminate a drift at the stationary position of the recording/reproducing element and obtain a position detecting signal having a preferable signal-to-noise ratio (S/N).

Referring to FIGS. 18(a) and 18(b), there is illustrated a conventional drive device for driving a magnetic head 117 of a VTR which drives and displaces the magnetic head 117 by using a voice coil motor and detects the position of the magnetic head by displacing a light shielding member 118 mounted at a moving portion of the drive device on an optical path from a light emitting diode 119 to a photodiode 120. In FIG. 18(a), reference numeral 113 designates a base portion; and 114 a sensor fixing stand. As shown in this figure, a magnetic-head holding member 115 is rigidly connected to an elastic supporting portion 116 fixed on the base portion 113. Moreover, the magnetic head 117 is mounted on an edge portion of the magnetic-head holding member 115. Furthermore, the light shielding member 118 is fixed on the top surface of the magnetic-head holding member 115, and a moving coil 124 is fixed on the bottom surface of the member 115.

The moving coil 124 fixed on the bottom surface of the magnetic-head holding member 115 is placed in a space formed among the inner surface of a cylindrical yoke 121 having a bottom, which is fixed on the base portion 113, and the outer surfaces of a permanent magnet 122 and a center pole 123 which are fixed on the yoke 121 in such a manner that the yoke 121, the magnet 122 and the pole 123 are coaxial. When supplying electric current to the moving coil 124, the magnetic-head holding member 115 is upwardly and downwardly driven and displaced, as viewed in FIG. 18, by an electromagnetic force generated due to both of an electric current flowing through the moving coil 124 and a magnetic flux produced in the space formed among the yoke 121, the magnet 122 and the pole 123. Consequently, the magnetic head 117 and the light shielding member 118 fixed on the magnetic-head holding portion 115 are also upwardly and downwardly driven and displaced, as viewed in FIG. 18.

Further, the light shielding member 118 fixed on the magnetic-head holding member 115 is inserted in the optical path between the light emitting diode 119 and the photodiode 120 mounted on the sensor fixing stand 114. Thus an output signal of the photodiode 120 changes correspondingly to the position of the light shielding member 18, the change of which is similarly to that of the position of the magnetic head 117 fixed on the magnetic-head holding member 115. Consequently, the position of the magnetic head 117 can be detected on tile basis of the output signal of the photodiode 120.

However, in case of the conventional device of FIG. 18, when a mounting member fixed on the sensor fixing stand 114 for mounting the light emitting diode 119 and the photodiode 120 (namely, a case for fixing and protecting the light emitting diode 119 and the photodiode 120) contracts in the direction indicated by an arrow Z of FIG. 18(b) owing to change in environmental temperature, the position of the light shielding member 118 inserted in the optical path from the light emitting diode 119 to the photodiode 120 relatively changes with respect to the diode 119 or the photodiode 120. This causes an error in the result of the detection of the position of the magnetic head 117.

Further, in a reproducing mode, it matters little in an operation of a closed-loop tracking control whether an error occurs in the result of the detection of the magnetic head 117. In contrast with this, in a recording mode, an error occurring in the result of the detection of the position of the magnetic head 117 gets into serious trouble. The reason is as follows. Namely, the mounting member fixed on the sensor fixing stand 114 for mounting the light emitting diode 119 and the photodiode 120 (namely, the case for fixing and protecting the light emitting diode 119 and the photodiode 120) is usually made of synthetic resin having a large coefficient of thermal expansion. Thus, the magnitude of an error occurring in the result of the detection of the position of the magnetic head 117 owing to change in environmental temperature cannot be ignored. Consequently, in case of a magnetic recording/reproducing apparatus which performs a recording operation by detecting the position of the magnetic head in a recording mode, an error occurring in the result of the detection of the position of the magnetic head 117 gets into serious trouble as above stated. Further, a means of settling the trouble is demanded.

It is, accordingly, a second object of the present invention to provide a device for detecting the position of a recording/reproducing element, which does not generate an error in the result of the detection of the position of the recording/reproducing element even when environmental temperature changes.

SUMMARY OF THE INVENTION

To achieve the foregoing first object, in accordance with a first aspect of the present invention, there is provided a device for detecting the position of a recording/reproducing element (hereunder sometimes referred to as a first position detecting device), which comprises two position detecting elements having substantially the same input/output characteristics, the outputs of which change correspondingly to change in position of the recording/reproducing element in such a manner to be complementary to each other the first and second position detecting elements and the recording/reproducing element and means for generating a difference signal representing the difference between the output signals of the two position detecting elements.

Thus, the two position detecting elements having substantially the same input/output characteristics outputs signals respectively representing changes, which are inverse with each other, correspondingly to the displacement of the recording/reproducing element. Further, a signal indicating the difference between the changes represented by the output signals of the position detecting elements is employed as a position detecting signal. Thereby, a precise displacement signal can be stably obtained from the recording/reproducing element with a simple configuration. Further, the precision of the detection of the recording/reproducing element can be improved. Moreover, a drift at the stationary position of the recording/reproducing element is completely eliminated. Furthermore, a position detecting signal having a preferable S/N can be obtained by performing an addition of signal components and a subtraction and an averaging of random noise components. In addition, a noise coming from the outside such as disturbance light can be eliminated by the subtraction. Incidentally, tile change of the signals owing to change in temperature of a wide range can be compensated by adding a simple compensation circuit to the device for detecting the position of tile recording/reproducing element.

However, the first position detecting device has defects that the size thereof cannot be sufficiently decreased and that the recording/reproducing element is displaced to excess if the drive device twists or turns the recording/reproducing element, as will be described later in detail in connection with a preferred embodiment of the present invention.

To eliminate such defects of the first position detecting device, in accordance with a second aspect of the present invention, there is provided a device for detecting the position of a recording/reproducing element, which comprises two position detecting elements respectively corresponding to first and second protruding portions provided at both sides of a part, on which a recording/reproducing element is mounted, of a moving portion of a drive device for driving a recording/reproducing element and means for generating a difference signal representing the difference between output signals respectively outputted from the two position detecting elements. Each of the first and second protruding portions has first and second end surfaces respectively facing first and second directions in which the moving portion moves. Namely, a first pair of the first end surfaces of the first and second protruding portions faces the first direction and on the other hand a second pair of the second end surfaces thereof faces the second direction. Further, the end surfaces of the first or second pair corresponding to one of the first and second directions are contained in the same plane. Moreover, the end surfaces of the other pair are placed on opposite sides of the plane containing the end surfaces of the first or second pair corresponding to the one of the first and second directions. Furthermore, when the recording/reproducing element is placed at a reference position, the center of the recording/reproducing element is contained in the plane containing the end surfaces of the first or second pair corresponding to the one of the first and second directions.

Thereby, a small-sized position detecting device can be preferably realized. Further, even if the drive device twists or turns the recording/reproducing element when the drive device operates, an occurrence of the excessive displacement of the recording/reproducing element can be prevented.

To achieve the foregoing second object, in accordance with a third aspect of the present invention, there is provided a device for detecting the position of a recording/reproducing element, which is adapted to generate a signal corresponding to the position of the recording/reproducing element correspondingly to the quantity of the displacement of a position detecting edge portion of a light shielding member fixed to a moving portion of a drive device for driving the recording/reproducing element when the light shielding member moves in an optical path from a light emitting element to a light receiving element, wherein a composing member provided with the light emitting element and the light receiving element is rigidly mounted on a fixed portion in such a manner that the direction, in which the displacement of the composing member is caused by the expansion or the contraction thereof owing to a heating or refrigerating thereof, is in agreement with the direction in which the position detecting edge portion of the light shielding portion extends.

Thereby, even when environmental temperature changes, the quantity of light emitted from the light emitting element to the light receiving element does not change. Thus, an occurrence of an error in the result of the detection of the position of the recording/reproducing element can be prevented even when environmental temperature changes.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 2(a) to 2(e) are a plan view, side views and a front view of the drive device of FIG. 1;

FIG. 3 is a circuit diagram of an example of a position detecting circuit;

FIGS. 5(a) and 5(b) are perspective diagrams for showing a modification of the position detecting portion for detecting the position of the recording/reproducing element according to the present invention;

FIGS. 9(a) to 9(c), 10(a) to 10(c), 11(a) and 11(b) are diagrams for illustrating examples of parts of the device for detecting the recording/reproducing element according to the present invention;

FIGS. 15(a) to 15(e) are a plane view, side views and a front view of still another device for detecting the position of a recording/reproducing element according to the present invention;

DETAILED DESCRIPTION OF THE PREFERRED EMBODIMENTS

Hereinafter, preferred embodiments of the present invention will be described in detail by referring to the accompanying drawings.

Figure 1:
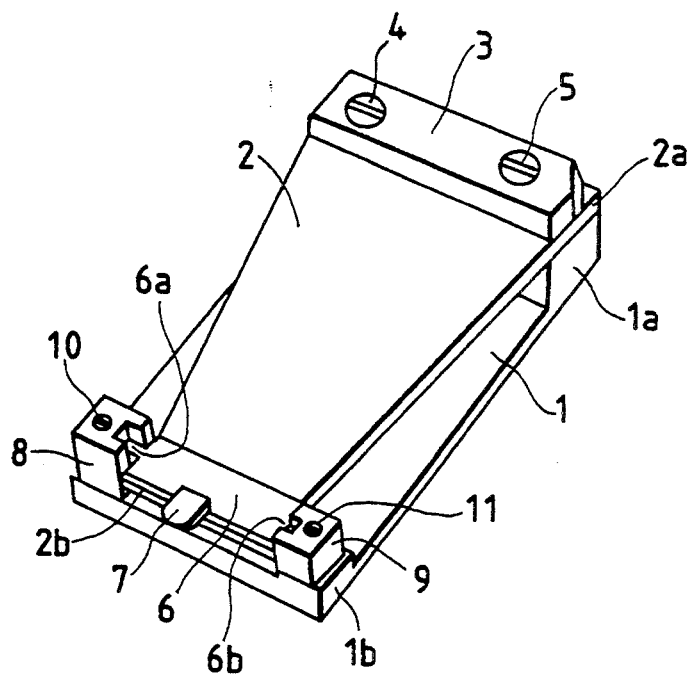
FIG. 1 is a perspective diagram for showing a drive device for driving a recording/reproducing element, which is provided with the device for detecting the position of the recording/reproducing element according to the present invention.

FIG. 1 is a perspective diagram for showing a drive device for driving a recording/reproducing element, which is provided with the device for detecting the position of a recording/reproducing element according to the present invention. Further, FIG. 2(a) to 2(e) are a plan view, side views and a front view of the drive device of FIG. 1. Moreover, FIG. 3 is a circuit diagram of an example of a position detecting circuit. Furthermore, FIG. 4 is a side view of a modification of a position detecting portion of the recording/reproducing element according to the present invention. Additionally, FIG. 5 is a perspective diagram for showing a modification of the position detecting portion for detecting the position of the recording/reproducing element according to the present invention.

In FIGS. 1 and 2, reference numeral 1 designates a base portion; 1a and 1b protruding portions for mounting members thereon; and 2 a bimorph which is made of electrostrictive material and is used as an electro-mechanical transducing element. A foundation portion 2a of the bimorph 2 is first put on the top surface of the base portion 1. Then, a holding-down plate 3 is further put on the top portion of the foundation portion 2a. Subsequently, the holding-down plate 3 and the bimorph 2 are fixed on the protruding portion 1a by using screws 4 and 5.

Further, an operating plate 6 of the position detecting portion is fixed on an end portion 2b of the bimorph 2. Moreover, protruding portions 6a and 6b are respectively formed on end portions of the operating plate 6 of the position detecting portion. As is apparent from a partially cutaway enlarged plan sectional view of FIG. 2(d), the protruding portion 6a of the operating plate 6 protrudes in an optical path between a light emitting portion 29A and a light receiving portion 30A of a photo-interrupter 8 which is used as a position detecting element. Similarly, the protruding portion 6b of the operating plate 6 protrudes in an optical path between a light emitting portion 31A and a light receiving portion 32A of another photo-interrupter 9 which is also used as a position detecting element.

The photo-interrupters 8 and 9 used as the position detecting elements are formed by light emitting elements 29 and 31, which may be light emitting diodes and are respectively provided in the light emitting portions 29A and 31A, and light receiving elements 30 and 32, which may be phototransistors and are respectively provided in the light receiving portions 30A and 32A to receive light emitted from the light emitting elements 29 and 31. Incidentally, the two photo-interrupters 8 and 9 have substantially the same input/output characteristics.

Further, in the two photo-interrupters 8 and 9, the quantity of light emitted from each of the light emitting elements 29 and 31 and received by a corresponding one of the light receiving elements 30 and 32 varies according to the manner of the displacement of a corresponding one of the protruding portions 6a and 6b which are adapted to be displaced together with a recording/reproducing element 7, which may be a magnetic head, owing to the deformation of the bimorph 2 in the direction indicated by arrows Y of FIG. 2 in a corresponding one of the optical path between the light emitting portion 29A and the light receiving portion 30A and the optical path between the light emitting portion 31A and the light receiving portion 32A.

FIG. 2(e) is a sectional side view taken on line X—X of FIG. 2(d). As is seen from FIG. 2(e), the light receiving elements 30 and 32 are arranged in such a manner that the quantities of light received by the light receiving elements 30 and 32 change in a complementary manner under the action of the protruding portions 6a and 6b for shielding light. Thus output signals of the light receiving elements 30 and 32 vary in a complementary fashion in accordance with the displacement of the protruding portions 6a and 6b. Incidentally, circles drawn in the sections of the light receiving elements 30 and 32 by using solid and dotted curves represent light receiving surfaces of photoelectric conversion portions thereof.

Referring next to FIG. 3, there is shown an example of a position detecting circuit. As is seen from this figure, a voltage generated across a resistor 34 due to an output electric current of the light receiving element 30 which receives light emitted from the light emitting element 29 of the photo-interrupter 8 is supplied through a resistor 38 to an inverting input terminal of a first operational amplifier 44. On the other hand, a voltage generated across a resistor 36 owing to an output electric current of the light receiving element 32 which receives light emitted from the light emitting element 31 of the photo-interrupter 9 is supplied through a resistor 38 to a noninverting input terminal of a second operational amplifier 45.

As shown in FIG. 3, a resistor 40 provided between an output terminal and the inverting input terminal of the first operational amplifier 44, a resistor 39 provided between a noninverting input terminal of the amplifier 44 and the ground, a resistor 38 provided between the inverting input terminal of the amplifier 44 and an output terminal of the light receiving element 30 of the photo-interrupter 8 and a resistor 37 provided between the noninverting input terminal of the amplifier 44 and an output terminal of the light receiving element 32 of the photo-interrupter 9 have the same resistance R. This results in that an output voltage of the operational amplifier 44 becomes equal to the difference between a voltage inputted to the noninverting input terminal thereof and another voltage inputted to the inverting input terminal thereof.

Thus, if the positions of the protruding portions 6a and 6b are preliminarily regulated by using the bimorph 2 and the operating plate 6 in such a manner that the quantity of light to be incident on the light receiving element 30 is equal to that of light to be incident on the light receiving element 32 when the recording/reproducing element 7 is placed at a normal position, outputs of the light receiving elements 30 and 32 having substantially the same input/output characteristics become equal to each other and therefore the output of the first operational amplifier 44 becomes 0.

Referring again to FIG. 2(e), there is illustrated the relative positional relation among the light receiving surfaces of the light receiving elements 30 and 32 and the protruding portions 6a and 6b of the operating plate 6. As is viewed in this figure, an upper half of the light receiving surface of the light receiving element 30 of the photo-interrupter 8 is shielded from light by the protruding portion 6a of the operating plate 6 of the position detecting portion. On the other hand, an upper half of the light receiving surface of the light receiving element 32 of the photo-interrupter 9 is shielded from light by the protruding portion 6b of the operating plate 6 of the position detecting portion. However, when the operating plate 6 of the position detecting portion displaces in the direction indicated by the arrow Y in this figure, the quantities of light incident on the light receiving elements 30 and 32 of the photo-interrupters 8 and 9 change in a complementary way under the action of the protruding portions 6a and 6b provided in the operating plate 6 for shielding light.

For instance, if the operating plate 6 of the position detecting portion upwardly moves from the position thereof indicated in FIG. 2(e) by ΔY when the recording/reproducing element 7 shifts from the normal position thereof, the protruding portions 6a and 6b of the operating portion 6 of the position detecting portion also moves upwardly by ΔY in this figure. This results in that the light-receiving surface area of the light receiving element 30 increases by an area corresponding to the upward displacement ΔY of the protruding portion 6a of the operating plate 6 and that conversely, the light-receiving surface area of the light receiving element 32 decreases by an area corresponding to the upward displacement ΔY of the protruding portion 6b of the operating plate 6.

In contrast, if the operating plate 6 of the position detecting portion downwardly moves from the position thereof indicated in FIG. 2(e) by ΔY when the recording/reproducing element 7 shifts from the normal position thereof, the protruding portions 6a and 6b of the operating portion 6 of the position detecting portion also moves downwardly by ΔY in this figure. This results in that the light-receiving surface area of the light receiving element 30 decreases by an area corresponding to the upward displacement ΔY of the protruding portion 6a of the operating plate 6 and that conversely, the light-receiving surface area of the light receiving element 32 increases by an area corresponding to the upward displacement ΔY of the protruding portion 6b of the operating plate 6.

As described above, the positions of the protruding portions 6a and 6b, each of which serves to shield light in the optical path between the corresponding light emitting portion and the corresponding light corresponding light receiving portion are preliminarily set in such a manner that the quantity of light incident on the light receiving element 30 of the photo-interrupter 8 becomes equal to that of light incident on the light receiving element 32 of the photo-interrupter 9 when the recording/reproducing element 7 is at the normal position thereof. Further, output signals of the light receiving elements 30 and 32 are adapted to change in a complementary manner according to change in the positions of the protruding portions 6a and 6b of the operating plate 6 which move in accordance with the direction and distance of the shift of the recording/reproducing element 7 from the normal position thereof. Thus the light receiving elements 30 and 32 generate output signals, of which the levels are always constant, even when the luminance of the light emitting diodes and dark currents of the phototransistors vary with temperature. Consequently, the level of the output signal of the first operational amplifier 44 becomes 0. As stated above, an output signal of the first operational amplifier 44, to which output signals of the light receiving elements 30 and 32 changing in a complementary manner according to the displacement of the protruding portions 6a and 6b are inputted, represents the difference between the levels of the signals inputted thereto. Therefore, the output signal of the first operational amplifier 44 has a signal variation component which is twice a signal variation component generated in an output signal of a phototransistor correspondingly to the magnitude of the shift of the recording/reproducing element 7 from the normal position thereof. Moreover, output signal components corresponding to the dark currents flowing through the light receiving elements 30 and 32 respectively provided in the photo-interrupters 8 and 9 are cancelled and thus are not contained in an output signal of the operational amplifier 44.

It is as well known that in a conventional photo-interrupter employing a light emitting diode and a phototransistor as a light emitting element and a light receiving element, respectively, the light emitting diode decreases in luminance but the dark current flowing through the phototransistor increases when temperature rises. Now, consider a case where the dark current of the phototransistor increases when temperature rises.

In this case, although the quantity of light incident on the phototransistor does not change, an output current of the phototransistor becomes in a state in which the dark current is added as an additional component to an intrinsic output current corresponding to the quantity of light incident on the phototransistor. Namely, an output signal of the phototransistor becomes in a state in which an S/N is deteriorated by superposing a noise on an intrinsic position signal. In contrast, in case of the position detecting device for detecting the position of a recording/reproducing element according to the present invention, even when environmental temperature in the vicinity of the position detecting device changes more or less, the effects of changes in dark currents generated in the light receiving elements in response to the change of the environmental temperature are cancelled by the action of the first operational amplifier 44 and thus the changes in the dark currents do not show their effects in an output current of the operational amplifier 44 as above described. Therefore, an output signal of the first operational amplifier 44 can be employed as a position detecting signal having a preferable S/N. Moreover, by employing the configuration of this circuit, not only the effects of changes in dark currents can be cancelled but also random noises can be decreased by effecting a subtracting and averaging thereof. Further, by adding the result to the above described signal component, the S/N can be simply improved by more than 6 decibels (dB).

Conversely, in case where the environmental temperature changes extensively, changes in luminance of the light emitting diode and in photoelectric current generated in the photodiode owing to the change in environmental temperature become problems. However, in this case, these problems can be solved by compensating an output signal of the first operational amplifier 44 by using a temperature compensating circuit before the output signal is outputted from the position detecting circuit. In case of this embodiment, a circuit provided between the output terminal of the first operational amplifier 44 and an output terminal 47 of the position detecting circuit of FIG. 3.

In the temperature compensating circuit illustrated in FIG. 3, an output signal of the first operational amplifier 44 is supplied through a resistor 41 to an noninverting terminal of the second operational amplifier 45, the output terminal of which is connected to the output terminal 47 of the position detecting circuit. Further, a resistor 43 is inserted between the inverting terminal and the output terminal of the second operational amplifier 45. Moreover, a resistor 42 and a thermistor 46, which is placed in the neighborhood of the photo-interrupters 8 and 9 and thus is in the same environment as of these photo-interrupters, are provided between the inverting terminal of the second operational amplifier 45 and the ground. Thereby, the problems of changes in luminance of the light emitting diodes and in photoelectric current of the photodiodes occurring in the case where the temperature in the environment of the position detecting device changes extensively can be solved by changing the gain of the circuit in a predetermined manner correspondingly to the change in temperature.

Figure 4A:
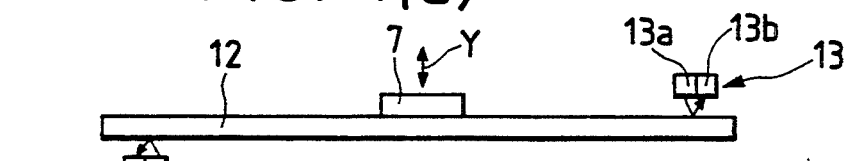
FIGS. 4(a) to 4(c) are side views of a modification of a position detecting portion of the recording/reproducing element according to the present invention.
Figure 4B:
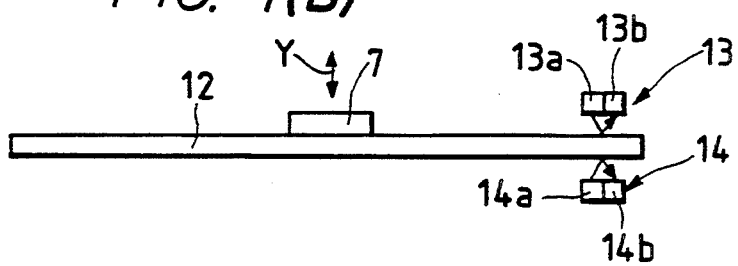

FIGS. 4(a) to 4(c), 5(a) and 5(b) are diagrams for illustrating other examples of the position detecting portion. FIGS. 4(a) and 4(b) illustrate an example of the position detecting portion which detects the position of a recording/reproducing element 7 by photo-interrupters 13 and 14 of the reflection type. Incidentally, in these figures, reference numeral 12 designates a supporting plate for supporting the recording/reproducing element 7.

In these figures, reference characters 13a and 14a denote light emitting portions; and 13b and 14b light receiving portions. In each of the photo-interrupters 13 and 14 of the reflection type, light emitted from the corresponding light emitting portion 13a or 14a is reflected by the supporting plate 12 for supporting the recording/reproducing element 7. Then, the thus reflected light is incident on the corresponding light receiving portion 13b or 14b.

The example of the position detecting portion illustrated in FIG. 4(a) has construction in which the photo-interrupter 13 of the reflection type is provided separately from the top surface of an end portion of the supporting plate 12 for supporting the recording/reproducing element 7 by a predetermined distance. Further, the other photo-interrupter 14 of the reflection type is provided separately from the bottom surface of another end portion of the supporting plate 12 by a predetermined distance. When the recording/reproducing element 7 moves in the direction indicated by the arrow Y in FIG. 4(a), the photo-interrupters 13 and 14 outputs signals which change in a complementary manner.

Similarly, the example of the position detecting portion illustrated in FIG. 4(b) has construction in which the photo-interrupter 13 of the reflection type is provided separately from the top surface of an end portion of the supporting plate 12 for supporting the recording/reproducing element 7 by a predetermined distance. Further, the other photo-interrupter 14 of the reflection type is provided separately from the bottom surface of the end portion of the supporting plate 12 by a predetermined distance. When the recording/reproducing element 7 moves in the direction indicated by the arrow Y in FIG. 4(b), output signals of the photo-interrupters 13 and 14 change in a complementary manner.

Figure 4C:
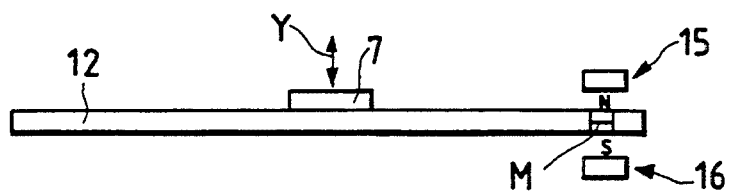

Furthermore, another example of the position detecting portion illustrated in FIG. 4(c) employs magneto-electrical transducing elements as position detecting elements instead of the photo-interrupters. This example of the position detecting portion has construction in which a permanent magnet M is provided in an end portion of the supporting plate 12 for supporting the recording/reproducing element 7, and a magneto-electrical transducing element (e.g., a Hall-effect element) 15 provided separately from a magnetic pole of the permanent magnet M by a predetermined distance. Further, the other magneto-electrical transducing element (e.g., a Hall-effect element) 16 provided separately from the other magnetic pole of the permanent magnet M by a predetermined distance. When the recording/reproducing element 7 moves in the direction indicated by the arrow Y in FIG. 4(c), output signals of the magneto-electrical transducing elements 15 and 16 change in a complementary manner.

Referring next to FIG. 5(a), there is illustrated further another example of the position detecting portion. In this example of the position detecting portion, a supporting plate 19 for supporting the recording/reproducing element is provided as a light shielding device between light receiving surfaces 17 and 18 provided face-to-face with each other. When the supporting plate 19 for supporting the recording/reproducing element moves in the direction indicated by an arrow 26 in FIG. 4(c), output signals of the magneto-electrical transducing elements 15 and 16 change in a complementary manner.

Turning to FIG. 5(b), there is shown another example of the position detecting portion in which two light receiving elements 22 and 23 are mounted on a recording/reproducing element 21, and each of light shielding devices 24 and 25 is fixedly and individually provided between the light receiving surface of the corresponding light receiving element 22 or 23 and the light emitting element 20 facing the corresponding element 22 or 23. When the recording/reproducing element 21 moves in the direction indicated by the arrow Y in FIG. 5(b), output signals of the magneto-electrical transducing elements 22 and 23 change in a complementary manner.

Figure 12:
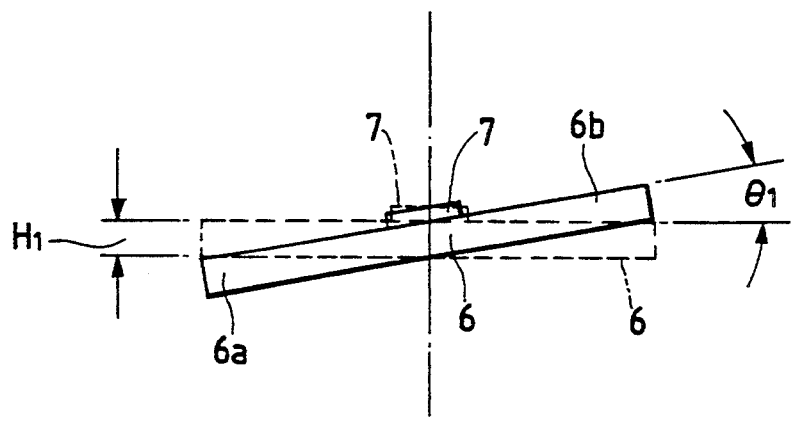
FIG. 12 is a diagram for illustrating an operation of the position detecting device of FIG. 2.

Incidentally, the bimorph 2 used for displacing and driving the recording/reproducing element 7 operates in complex oscillation modes. Thus, for example, a twist with an angle $\theta 1$ may occur in the operating plate 6 of the position detecting portion provided on a free end portion of the bimorph 2 as illustrated in FIG. 12. However, if the inclination or twist with the angle $\theta 1$ causes the displacement H1 of the protruding portions 6a and 6b of the operating plate 6 as illustrated in FIG. 12, the effects of the displacement H1 of the protruding portions 6a and 6b on the light receiving elements 30 and 32 respectively provided in the photo-interrupters 8 and 9 are cancelled. Namely, the displacement H1 of the protruding portions 6a and 6b does not have an effect on output signals of the light receiving elements 30 and 32.

In case of the device for detecting the position for the recording/reproducing element as illustrated in FIG. 2, the two position detecting elements having substantially the same input/output characteristics, the outputs of which are generated correspondingly to change in position of the recording/reproducing element and change in a complementary manner, are arranged as described above with reference to FIG. 2. Namely, the protruding portions 6a and 6b, which shield light in the optical paths between the light emitting portions and the light receiving portions, of the operating plate 6 of the position detecting portion are preliminarily regulated in such a manner that the quantities of light incident on the light receiving elements 30 and 32 respectively provided in the photo-interrupters 8 and 9 become equal to each other when the recording/reproducing element 7 is at the normal position thereof. Further, the photo-interrupters 8 and 9 are shifted in the direction of thickness (i.e., in the traverse direction) of the operating plate 6 in such a manner that output signals of the light receiving elements 30 and 32 change in a complementary fashion according to change in position of the protruding portions 6a and 6b of the operating plate 6 which moves correspondingly to the direction and magnitude of a shift of the recording/reproducing element 7 from the normal position thereof. Thus, the device of FIG. 2 has a defect that it is difficult to mount this device in a rotating drum which has only a small space (hereunder sometimes referred to as a fitting space) for the mounting of this device. Moreover, the position (hereunder sometimes referred to as the fitting position of the recording/reproducing element), at which the recording/reproducing element is fixed, and the centers of the two position detecting elements are shifted in the direction of the displacement of the recording/reproducing element. Thus, the device of FIG. 2 has another defect that when the moving portion of the drive device for driving the recording/reproducing element effects twisting motion, the recording/reproducing element displaces in both of the direction of the extension line of a track and the direction of the width (i.e., the traverse direction) of the track. These defects will be described more particularly hereinbelow by referring to FIGS. 13 and 14.

Figure 13A:
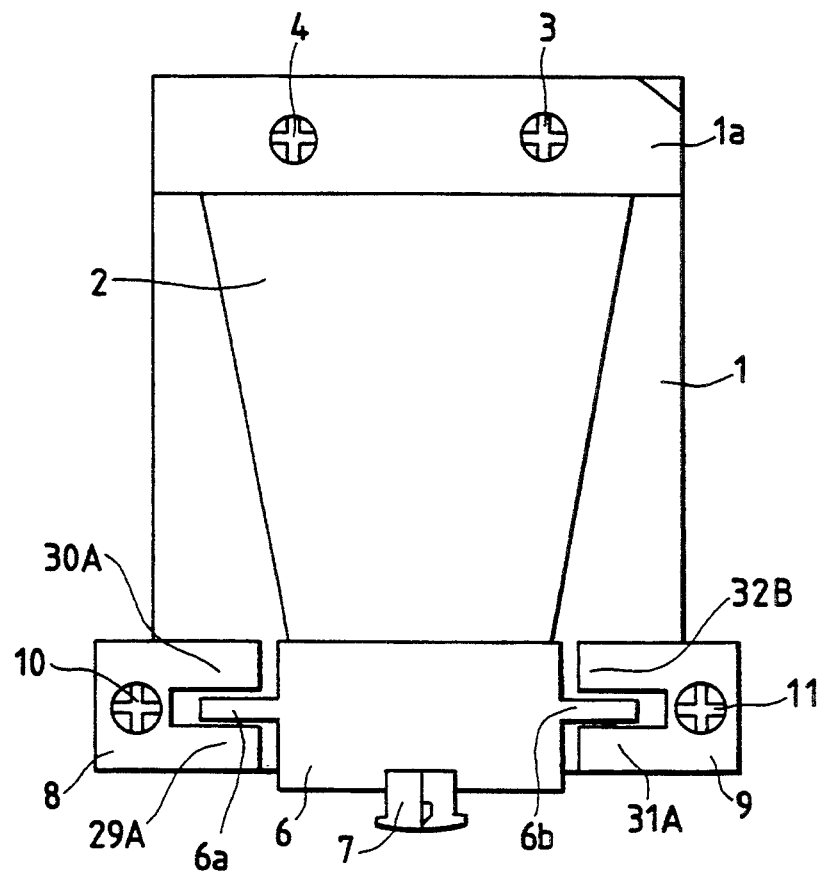
Figure 13B:
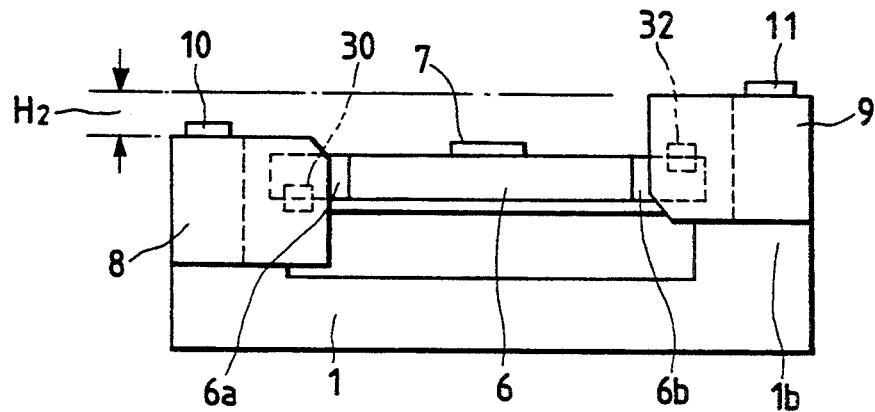

FIGS. 13(a) and 13(b) correspond to FIGS. 2(a) and 2(c), respectively. In FIG. 13(b), reference character H2 designates the difference in height between the top end surfaces of the photo-interrupters 8 and 9 and corresponds to the thickness of each of the protruding portions 6a and 6b which is the same as the thickness of the operating plate 6. This difference H2 in height between the top end surfaces of the photo-interrupters 8 and 9 is due to the fact that the positions of the light receiving positions 30A and 32A respectively provided in the photo-interrupters 8 and 9 are shifted in the direction of the displacement of the recording/reproducing element 7 by the magnitude of thickness of the protruding portions 6a and 6b as is clearly illustrated in FIG. 2(e).

This raises the problem that it is difficult to mount the device of FIG. 2 in a rotating drum which has only a small fitting space therein. Although it is considered that this problem can be solved by using thin protruding portions 6a and 6b, this cannot be employed as a solution for the following reasons. Namely, the use of thin protruding portions 6a and 6b increases the compliance thereof and thus decreases the resonance frequencies thereof. Consequently, a positioning servo which is required to respond to a high-frequency signal cannot preferably operate.

Figure 14:
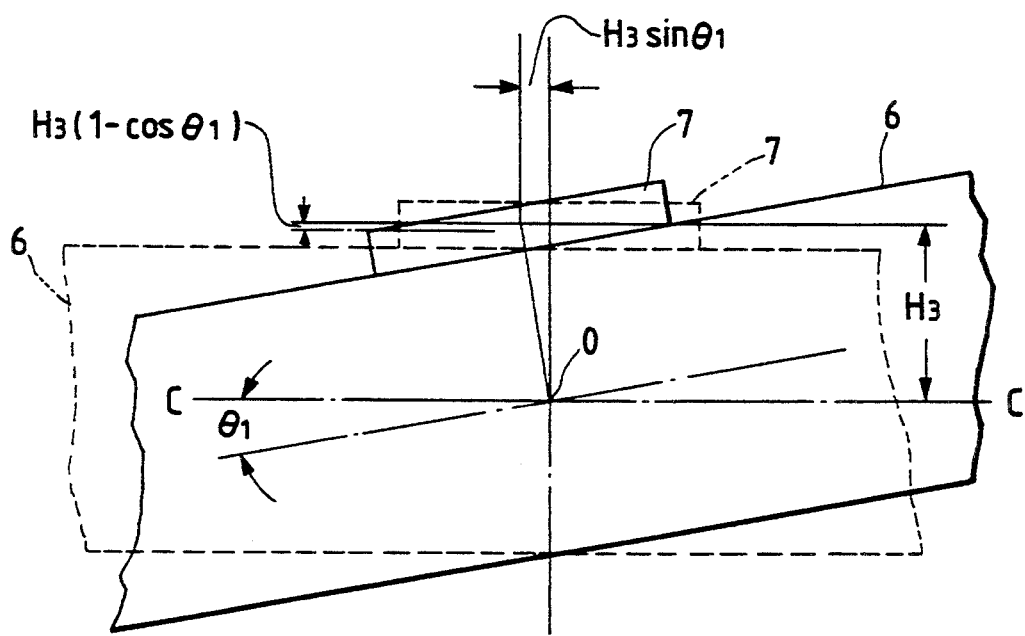
FIGS. 13(a), 13(b) and 14 are diagrams for illustrating problems which the position detecting device of FIG. 2 has encountered.

Next, as is seen from FIGS. 2, 13(a) and 13(b), in case where the fitting position of the recording/recording element 7 and the centers of the two photo-interrupters are shifted in the direction of the displacement of the recording/reproducing element 7, when the moving portion of the drive device for driving the recording/reproducing element effects twisting motion, the recording/reproducing element 7 displaces in both of the direction of the extension line of a track and the traverse direction of the track. FIG. 14 is a diagram for illustrating this problem. In this figure, a one-dot chain line C—C represents a straight line connecting the centers of the two position detecting elements. Further, reference character H3 designates the distance between the line C—C and the surface on which the element 7 is provided.

As described above by referring to FIG. 12, when a twist with the angle $\theta 1$ as illustrated in FIG. 14 in the operating plate 6 of the position detecting portion provided on a free end portion of the bimorph 2 is generated due to the operation of the bimorph 2 in the complex oscillation mode, output signal components generated in the light receiving elements 30 and 32 correspondingly to the displacement H1, which is owing to the inclination or twist with the angle $\theta 1$, of the protruding portions 6a and 6b of the operating plate 6 are cancelled, so that the displacement Hi of the protruding portions 6a and 6b does not have an effect on output signals of the light receiving elements 30 and 32. In case where the twist with the angle $\theta 1$ as illustrated in FIG. 14 in the operating plate 6 of the position detecting portion provided on the free end portion of the bimorph 2 is generated due to the operation of the bimorph 2 in the complex oscillation mode, the position of the recording/reproducing element 7 is shifted in the direction along the extension line of a track by a distance of $H3 \cdot \sin \theta 1$ and the element 7 displaces in the direction of the width of the track by a distance of $H3(1 - \cos \theta 1)$ if a surface (hereunder sometimes referred to as a fitting surface), on which the element 7 is mounted, of the plate 6 is shifted from the line connecting the centers of the two position detecting elements, which is indicated by the one-dot chain line C—C in FIG. 14. Thus, solutions of the above described problems of the device of FIG. 2 have been required.

Figure 6:
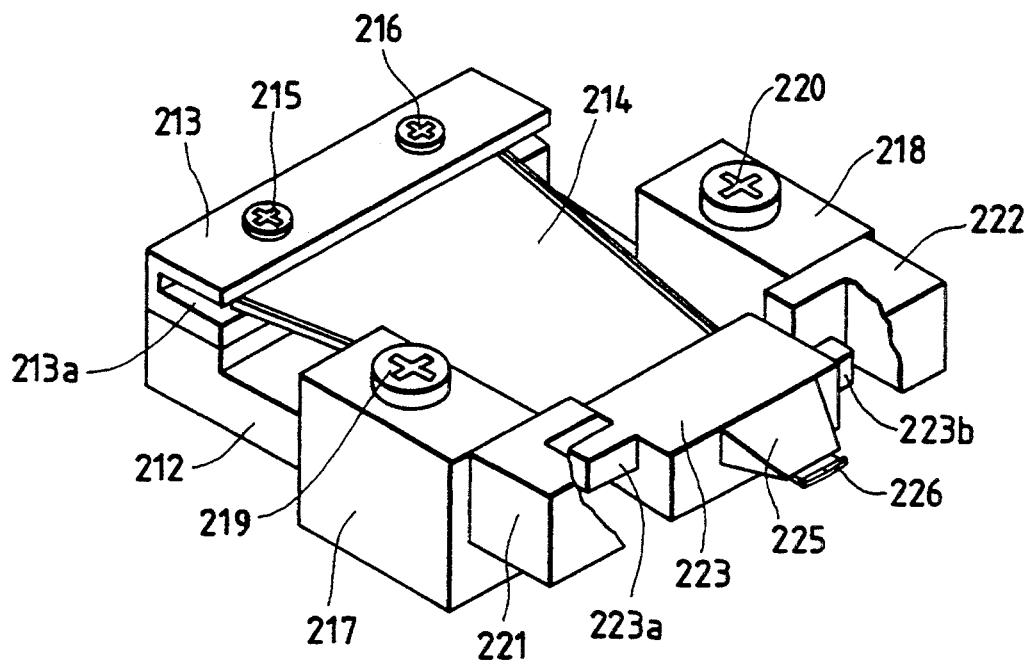
FIG. 6 is a perspective diagram for showing another drive device for driving a recording/reproducing element which is provided with the device for detecting the position of the recording/reproducing element according to the present invention.
Figure 7:
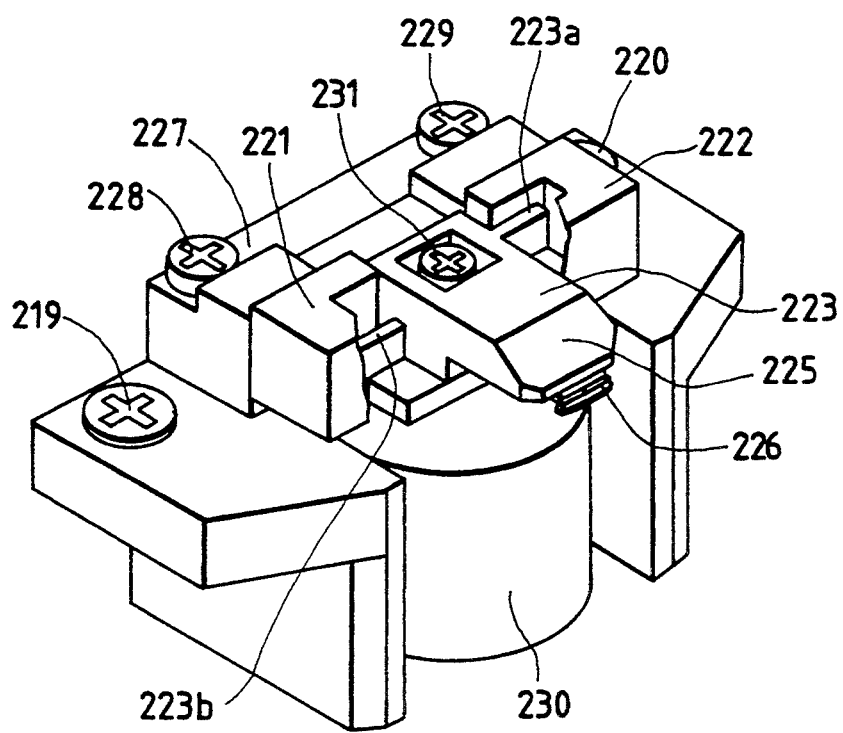
FIG. 7 is a perspective diagram for showing further another drive device for driving a recording/reproducing element, which is provided with the device for detecting the position of the recording/reproducing element according to the present invention.
Figure 8:
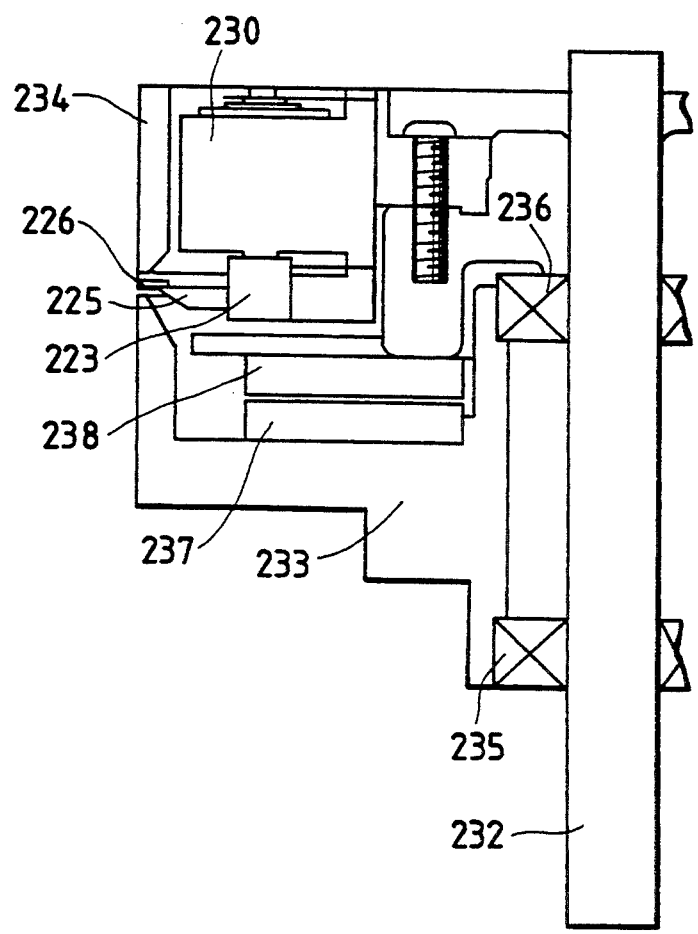
FIG. 8 is a vertical section of a rotating drum of a magnetic rotating head type VTR in which the drive device of FIG. 7 is fixed to the rotating drum.

In order to solve these problems, in accordance with the present invention, there are provided devices for detecting the position of a recording/reproducing element, which will be described hereinbelow with reference to FIGS. 6 to 11. FIGS. 6 and 7 are perspective diagrams for showing other drive devices each for driving a recording/reproducing element, which is provided with the device for detecting the position of the recording/reproducing element according to the present invention. FIG. 8 is a vertical section of a rotating drum of a magnetic rotating head type VTR in which the drive device of FIG. 7 is fixed to the rotating drum. FIGS. 9, 10 and 11 are diagrams for illustrating examples of parts of the device for detecting the recording/reproducing element according to the present invention.

In the device of FIG. 6, a recording/reproducing is element 226 is mounted through a fitting portion 225 on a moving portion 223 fixed to an end portion of the bimorph 214 made of an electrostrictive material, which is fixedly mounted by using screws 215 and 216 on a supporting member 213 secured on an end portion of a base portion 212 and has another end portion inserted in a gap 213a. In addition, first and second protruding portions 223a and 223b for shielding light to be used as composing elements of the position detecting element are fixed at both sides of the fitting position of the recording/reproducing element 226, respectively. In FIG. 6, reference numerals 217 and 218 designate fitting portions of photo-interrupters 221 and 222, respectively. Further, the fitting portions 217 and 218 are integrated with the base portion 212. Moreover, in the device of FIG. 7, a recording/reproducing element 226 is fixed through a fitting portion 225 to a moving portion 223 rigidly mounted by using a screw 231 on the drive shaft (not shown) of a voice coil motor 230 fixed to the base portion 230 by using screws 228 and 229. Furthermore, similarly as in case of the device of FIG. 6, first and second protruding portions 223a and 223b to be used as composing elements of the position detecting element are fixed at both sides of the fitting position of the recording/reproducing element 226, respectively. Incidentally, in FIGS. 6 and 7, screws 219 and 220 are respectively used to fix the fitting portions 217 and 218 to a rotating drum.

As shown in FIGS. 6 and 7, each of the first and second protruding portions 223a and 223b is inserted in a gap formed between the light emitting portion and the light receiving portion of the corresponding one of the photo-interrupters 221 and 222. (Incidentally, in FIGS. 6 and 7, parts of the photo-interrupters 221 and 222 are cut away therefrom in order to clearly show the states of the first and second protruding portions 223a and 223b.) Additionally, similarly as in case of the device of FIG. 2, the light emitting portion and the light receiving portion respectively provided in the photo-interrupters 221 and 222 are arranged at both sides of the first and second protruding portions 223a and 223b in such a fashion that part of light emitted from the light emitting portion is shielded by the first and second protruding portions 223a and 223b and the remaining part of the light reaches the light receiving portion.

Each of the first and second protruding portions 223a and 223b incorporating with the moving portion 223 of FIGS. 6 and 7 has two end surfaces which face to the direction of the displacement of the moving portion 223 and to the opposite direction thereof, respectively. Further, one of such end surfaces of the first protruding portion 223a (for instance, the bottom surface of the portion 223a of FIG. 6) and an end surface other than the corresponding one of such end surfaces of the second protruding portion 223b (namely, the top surface of the second protruding portion 223b of FIG. 6) are arranged in such a manner to be contained in the same plane (hereunder sometimes referred to as the center plane). Moreover, the other of such end surfaces of the first protruding portion 223a (namely, the top surface of the first protruding portion 223a of FIG. 6) and that of such end surfaces of the second protruding portion 223b (namely, the bottom surface of the second protruding portion 223b of FIG. 6) are arranged in such a fashion to be separated and placed at the opposite sides of the center plane. Incidentally, such an arrangement of the first and second protruding portions 223a and 223b will be more clearly understood by referring to FIGS. 9(c) and 10(c).

FIGS. 9(a) to 9(c) and 10(a) to 10(c) are diagrams for illustrating the positional relation among the first and second protruding portions 23a and 23b and the recording/reproducing element 226 fixed through the fitting portion 225 to the moving portion 223 of the device for detecting the position of the recording/reproducing element. FIGS. 9(a) and 10(a) are plan views of the device; FIGS. 9(b) and 10(b) side views thereof; and FIGS. 9(c) and 10(c) elevations thereof.

As shown in these figures, the first and second protruding portions 223a and 223b compose two different position detecting elements, respectively, in such a manner that end surfaces α and α, which face to the direction of the displacement of the moving portion 223 and are contained in the same plane, of the first and second protruding portions 223a and 223b are made to be contained in the common central plane section of the position detecting elements when the recording/reproducing element is at a reference position. In case of the device of FIG. 9, the recording/reproducing element 226 is mounted on the moving portion 223 through the fitting portion 225 in a state in which the element 226 is shifted from the plane containing the surfaces α and α of the first and second protruding portions 223a and 223b. In case of the device of FIG. 10, the recording/reproducing element 226 is mounted on the moving portion 223 through the fitting portion 225 in a state in which the element 226 is placed in the same plane as the plane containing the surfaces α and α of the first and second protruding portions 223a and 223b.

Figure 11A:
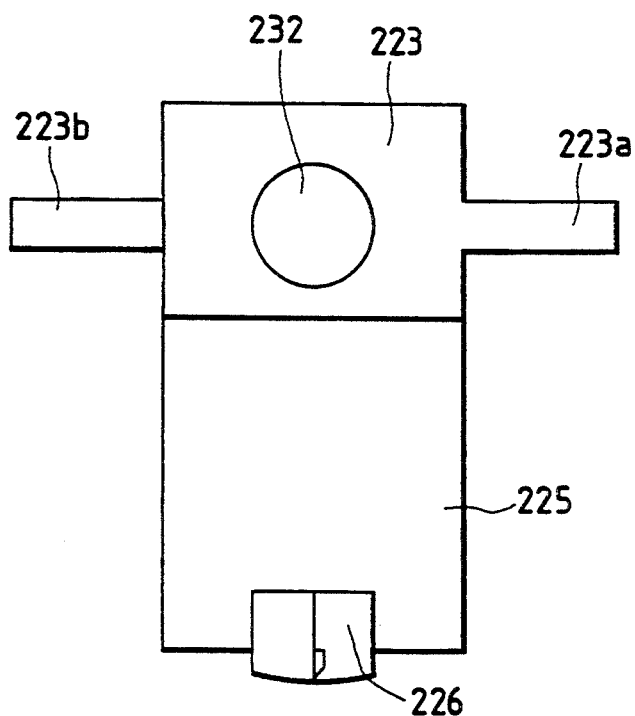
Figure 11B:
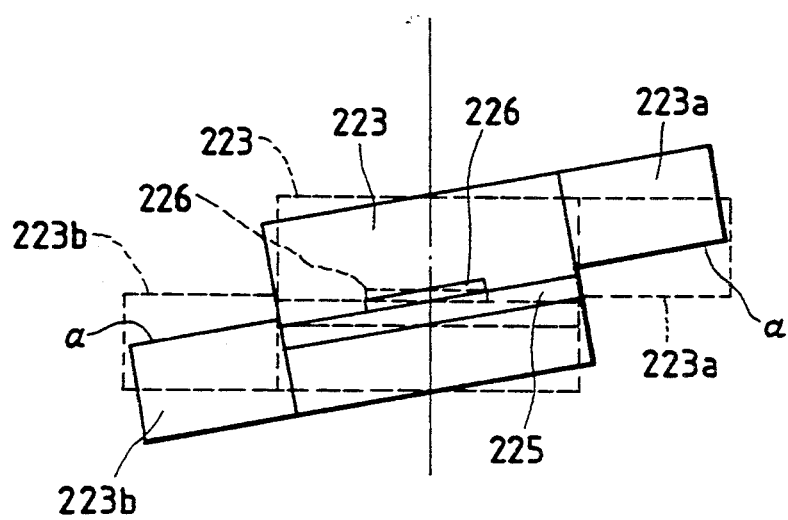

FIGS. 11(a) and 11(b) are diagrams for illustrating that when the recording/reproducing element 226 is mounted on the moving portion 223 through the fitting portion 225 in a state in which the element 226 is placed in the same plane as the plane containing the surfaces α and α of the first and second protruding portions 223a and 223b as illustrated in FIG. 10, the recording/reproducing element 226 never displaces in both of the direction along the extension line of a track and the direction of width of the track largely.

The device for detecting the position of the recording/reproducing element is provided with the position detecting elements respectively constructed in the first and second protruding portions 223a and 223b as described above. The precision of a detection of the position of the recording/reproducing element can be improved by providing the position detecting elements respectively constructed in the first and second protruding portions 223a and 223b in such a manner that the position detecting elements are equidistant from the recording/reproducing element 226.

As described above, the first and second protruding portions 223a and 223b compose two different position detecting elements, respectively, in such a manner that the end surfaces α and α facing to the direction, in which the displacement of the moving portion 223 is caused, of the portions 223a and 223b are contained in the same plane as described above and are made to be contained in the common central plane section of the position detecting elements when the recording/reproducing element is at a reference position. Thus, in comparison with the conventional device for detecting the position of a recording/reproducing element, the height of the device (hereunder sometimes referred to as the position detecting device) for detecting the position of a recording/reproducing element according to the present invention can be relatively low. Therefore, the position detecting device can easily be accommodated in a small space in a rotating drum 234 of a VTR employing a magnetic rotating head as illustrated in FIG. 8 and also can easily be fixed thereto.

In FIG. 8, reference numeral 232 denotes a revolving shaft; 233 a fixed drum; 235 and 236 bearings; and 237 and 238 rotary transformers. FIG. 8 shows an example of the application of the position detecting device according to the present invention, which employs the voice coil motor 230 illustrated in FIG. 7 as a drive device for driving a recording/reproducing element.

The photo-interrupters 221 and 222 used as the position detecting elements are formed by light emitting elements, which may be, for instance, light emitting diodes and are respectively provided in the light emitting portions, and light receiving elements, which may be, for example, phototransistors and are respectively provided in the light receiving portions to receive light emitted from the light emitting elements. Incidentally, the two photo-interrupters 221 and 222 have substantially the same input/output characteristics.

Further, in the two photo-interrupters 221 and 222, the quantity of light emitted from each of the light emitting elements and received by a corresponding one of the light receiving elements varies according to the manner of the displacement of a corresponding one of the protruding portions 223a and 223b incorporated with the moving portion 223 which is provided with a recording/reproducing element (for example, a magnetic head), in a corresponding one of the optical paths between the light emitting portions and the light receiving portions. The quantities of light received by the light receiving elements change in a complementary manner according to the displacement of the protruding portions 223a and 223b.

Thus, when the recording/reproducing element 226 is at a normal position, outputs of the light receiving elements of the photo-interrupters 221 and 222 having substantially the same input/output characteristics become equal to each other if the first and second protruding portions 223a and 223b compose two different position detecting elements, respectively, in such a manner that the end surfaces α and α of the portions 223a and 223b are made to be contained in the common central plane section of the position detecting elements when the recording/reproducing element is at a reference position, as described above. Therefore, in this state, an output of the differential amplifier, to which output signals of the two light receiving elements are inputted, becomes 0.

Further, when the recording/reproducing element 226 are shifted from the normal position thereof, the first and second protruding portions 223a and 223b incorporated with the moving portion 223 displace. Thereby, output signals of the photo-interrupters 221 and 222 change in a complementary way in accordance with the displacement of the protruding portions 223a and 223b. Thus, if the positions of the protruding portions 223a and 223b, each of which serves to shield light in the optical path between the corresponding light emitting portion and the corresponding light corresponding light receiving portion, are preliminarily set in such a manner that the quantity of light incident on the light receiving element of one of the two photo-interrupters becomes equal to that of light incident on the light receiving element of the other of the photo-interrupters when the recording/reproducing element 226 is at a normal position thereof, output signals of the light receiving elements respectively provided in the photo-interrupters 221 and 222 come to change in a complementary manner according to change in the positions of the protruding portions 223a and 223b which change in accordance with the direction and distance of the shift of the recording/reproducing element 226 from the normal position thereof. Thus the light receiving elements of the two photo-interrupters generate output signals, of which the levels are always constant, even when the luminance of the light emitting diodes and dark currents of the phototransistors vary with temperature. Consequently, the level of the output signal of the differential amplifier becomes 0.

As stated above, an output signal of the differential amplifier, to which output signals of the light receiving elements respectively provided in the photo-interrupters 221 and 222 changing in a complementary manner according to the displacement of the protruding portions 223a and 223b are inputted, represents the difference between the levels of the signals inputted thereto. Therefore, the output signal of the differential amplifier has a signal variation component which is twice a signal variation component generated in an output signal of a phototransistor correspondingly to the magnitude of the shift of the recording/reproducing element 226 from the normal position thereof. Moreover, output signal components corresponding to the dark currents flowing through the light receiving elements respectively provided in the photo-interrupters 221 and 222 are cancelled and thus are not contained in an output signal of the differential amplifier.

Figure 16A:
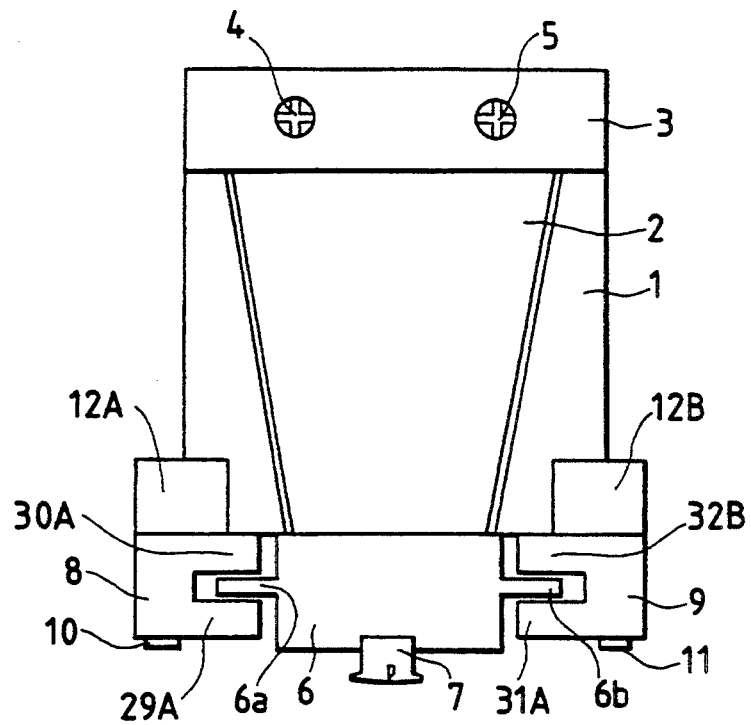
FIGS. 16(a) to 16(c) are a plane view and side views of yet another device for detecting the position of a recording/reproducing element according to the present invention.
Figure 16B:
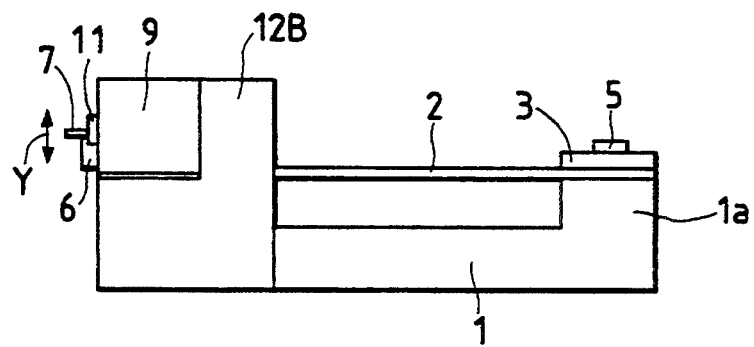
Figure 16C:
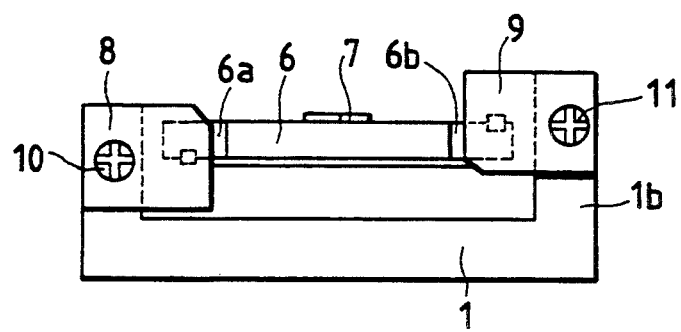

Next, another embodiment of the present invention will be described in detail by referring to FIGS. 15 to 17. FIGS. 15 and 16 are diagrams for illustrating position detecting devices embodying the present invention. Further, FIG. 17 is a diagram for illustrating a constructing principle and a operating principle of such a position detecting device embodying the present invention. Referring first to FIG. 15, there is shown another embodiment of the present invention. FIG. 15(a) is a plan view of this embodiment; FIG. 15(b) a side view thereof; FIG. 15(c) an elevational view thereof; FIG. 15(d) a partially cutaway sectional enlarged plan view thereof; and FIG. 15(e) a partially sectional view thereof.

In these figures, reference numeral 1 designates a base portion; 1a and 1b protruding portions for mounting members thereon; and 2 a bimorph which is made of electrostrictive material and is used as an electromechanical transducing element. A foundation portion 2a of the bimorph 2 is first put on the top surface of the base portion 1. Then, a holding-down plate 3 is further put on the top portion of the foundation portion 2a. Subsequently, the holding-down plate 3 and the bimorph 2 are fixed on the protruding portion 1a by using screws 4 and 5. Further, an operating plate 6 of the position detecting portion is fixed on an end portion 2b of the bimorph 2.

Moreover, protruding portions 6a and 6b are respectively formed on end portions of the operating plate 6 of the position detecting portion. As is seen from a partially cutaway enlarged plan sectional view of FIG. 15(d), the protruding portion 6a of the operating plate 6 protrudes in an optical path between a light emitting portion 29A and a light receiving portion 30A of a photo-interrupter 8 which is used as a position detecting element. Similarly, the protruding portion 6b of the operating plate 6 protrudes in an optical path between a light emitting portion 31A and a light receiving portion 32A of another photo-interrupter 9 which is also used as a position detecting element.

The photo-interrupters 8 and 9 used as the position detecting elements are formed by light emitting elements 29 and 31, which are, for example, light emitting diodes and are respectively provided in the light emitting portions 29A and 31A, and light receiving elements 30 and 32, which are, for instance, phototransistors and are respectively provided in the light receiving portions 30A and 32A to receive light emitted from the light emitting elements 29 and 31. Incidentally, the two photo-interrupters 8 and 9 have substantially the same input/output characteristics.

Further, in the two photo-interrupters 8 and 9, the quantity of light emitted from each of the light emitting elements 29 and 31 and received by a corresponding one of the light receiving elements 30 and 32 changes according to the way of the displacement of a corresponding one of the protruding portions 6a and 6b which are adapted to be displaced together with a recording/reproducing element 7 (for example, a magnetic head), owing to the deformation of the bimorph 2 in the direction indicated by arrows Y of FIG. 15 in a corresponding one of the optical path between the light emitting portion 29A and the light receiving portion 30A and the optical path between the light emitting portion 31A and the light receiving portion 32A.

FIG. 15(e) is a sectional side view taken on line X—X of FIG. 15(d). Incidentally, squares drawn in the sections of the light receiving elements 30 and 32 by using solid and dotted segments represent light receiving surfaces of photoelectric conversion portions thereof. As is seen from FIG. 15(e), the light receiving elements 30 and 32 are arranged in such a manner that the quantities of light received by the light receiving elements 30 and 32 change in a complementary fashion under the action of the protruding portions 6a and 6b for shielding light. Thus output signals of the light receiving elements 30 and 32 vary in a complementary manner in accordance with the displacement of the protruding portions 6a and 6b.

Thus, if the positions of the protruding portions 6a and 6b are preliminarily regulated by using the bimorph 2 and the operating plate 6 in such a manner that the quantity of light to be incident on the light receiving element 30 is equal to that of light to be incident on the light receiving element 32 when the recording/reproducing element 7 is placed at a normal position, outputs of the light receiving elements 30 and 32 having substantially the same input/output characteristics become equal to each other and therefore the output of the differential amplifier 44 becomes 0.

Referring once again to FIG. 15(e) which illustrates the relative positional relation among the light receiving surfaces of the light receiving elements 30 and 32 and the protruding portions 6a and 6b of the operating plate 6, it is found that an upper half of the light receiving surface of the light receiving element 30 of the photo-interrupter 8 is shielded from light by the protruding portion 6a of the operating plate 6 of the position detecting portion. On the other hand, an upper half of the light receiving surface of the light receiving element 32 of the photo-interrupter 9 is shielded from light by the protruding portion 6b of the operating plate 6 of the position detecting portion. However, when the operating plate 6 of the position detecting portion displaces in the direction indicated by the arrow Y in this figure, the quantities of light incident on the light receiving elements 30 and 32 of the photo-interrupters 8 and 9 vary in a complementary way under the action of the protruding portions 6a and 6b provided in the operating plate 6 for shielding light.

For example, if the operating plate 6 of the position detecting portion upwardly moves from tile position thereof indicated in FIG. 15(e) by ΔY when the recording/reproducing element 7 shifts from the normal position thereof, the protruding portions 6a and 6b of the operating portion 6 of the position detecting portion also move upwardly by ΔY in this figure. As the result, the light-receiving surface area of the light receiving element 30 increases by an area corresponding to the upward displacement ΔY of the protruding portion 6a of the operating plate 6. Conversely, the light-receiving surface area of the light receiving element 32 decreases by an area corresponding to the upward displacement ΔY of the protruding portion 6b of the operating plate 6. In contrast, if the operating plate 6 of the position detecting portion downwardly moves from the position thereof indicated in FIG. 15(e) by ΔY when the recording/reproducing element 7 shifts from the normal position thereof, the protruding portions 6a and 6b of the operating portion 6 of the position detecting portion also move downwardly by ΔY in this figure. As the result, the light-receiving surface area of the light receiving element 30 decreases by an area corresponding to the upward displacement ΔY of the protruding portion 6a of the operating plate 6 and that conversely, the light-receiving surface area of the light receiving element 32 increases by an area corresponding to the upward displacement ΔY of the protruding portion 6b of the operating plate 6.

As described above, the positions of the protruding portions 6a and 6b, each of which serves to shield light in the optical path between the corresponding light emitting portion and the corresponding light corresponding light receiving portion are preliminarily set in such a manner that the quantity of light incident on the light receiving element 30 of the photo-interrupter 8 becomes equal to that of light incident on the light receiving element 32 of the photo-interrupter 9 when the recording/reproducing element 7 is at the normal position thereof. Further, output signals of the light receiving elements 30 and 32 are adapted to change in a complementary manner according to change in the positions of the protruding portions 6a and 6b of the operating plate 6 which move in accordance with the direction and distance of the shift of the recording/reproducing element 7 from the normal position thereof. Thus the light receiving elements 30 and 32 generate output signals, of which the levels are always constant, even when the luminance of the light emitting diodes and dark currents of the phototransistors vary with temperature. Consequently, the level of the output signal of the first operational amplifier 44 becomes 0.

As stated above, an output signal of the differential amplifier, to which output signals of the light receiving elements 30 and 32 changing in a complementary manner according to the displacement of the protruding portions 6a and 6b are applied, represents the difference between the levels of the signals inputted thereto. Therefore, the output signal of the differential amplifier has a signal variation component which is twice a signal variation component generated in an output signal of a phototransistor correspondingly to the magnitude of the shift of the recording/reproducing element 7 from the normal position thereof. Moreover, output signal components corresponding to the dark currents flowing through the light receiving elements 30 and 32 respectively provided in the photo-interrupters 8 and 9 are cancelled and thus are not contained in an output signal of the differential amplifier.

As shown in FIGS. 15(a) to 15(e), the recording/reproducing element 7 is mounted on the operating plate 6 of the position detecting portion which is fixed to an end portion 2b of the bimorph 2 used as a moving portion of the drive device for driving the recording/reproducing element. Moreover, the protruding portions 6a and 6b provided at both ends of the operating plate 6 serve as light shielding members inserted in the optical paths between the light emitting element 29 and the light receiving element 30 and between the light emitting element 31 and the light receiving element 32.

Further, cases for accommodating the photo-interrupters 8, on which the light emitting element 29 and the light receiving element 30 are mounted, and the element 9, on which the light emitting element 31 and the light receiving element 32 are mounted, expand (or shrink) by being heated (or refrigerated) owing to environmental temperature. In case of the position detecting device of FIG. 15, the photo-interrupters 8 and 9 are fixed to the base portion 1 by using fitting screws 10 and 11, respectively, in such a manner that the direction, in which the displacement of the cases is caused due to the expansion or shrinkage, is in agreement with the direction along which edge portions of the protruding portions 6a and 6b for detecting the position of the recording/reproducing element extend.

Figure 17A:
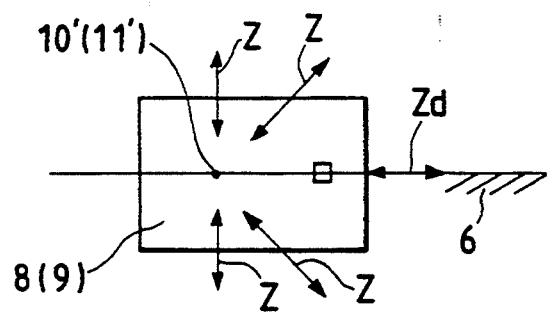
FIGS. 17(a) and 17(b) are diagrams for illustrating a constructing principle and a operating principle of a device for detecting the position of a recording/reproducing element according to the present invention.

In FIG. 17(a), arrows Z indicate the directions in which the cases of the photo-interrupters 8 and 9 fixed to the base portion 1 in the above described manner expand or shrink due to environmental temperature. Further, reference character 10 designates a position at which the photo-interrupter 8 is fixed to the base portion 1 by using the screw 10; 11 designates a position at which the photo-interrupter 9 is fixed to the base portion 1 by using the screw 11; and $Z_d$ the direction in which the displacement of a case used for accommodating the fitting portions of the light emitting element and the light receiving element due to change in environmental temperature is effected. Thus, in case of the position detecting device of FIG. 15 according to the present invention, even when the cases accommodating the photo-interrupter 9 expand or shrink and displaces due to change in environmental temperature, the displacement of the cases has no effect on the result of a detection of the position of a magnetic head.

FIG. 16 is a diagram for showing another device for detecting a recording/reproducing element embodying the present invention. In case of this device of FIG. 16, the direction in which the photo-interrupters 8 and 9 are fixed by using the screws 10 and 11, respectively, is different from the direction, in which the photo-interrupters 8 and 9 are fixed by using the screws 10 and 11, respectively, in case of the device of FIG. 15, by 90 degrees. Incidentally, the position detecting device of FIG. 16 is different from the position detecting device of FIG. 1 in that the photo-interrupters 8 and 9 are not directly fixed to the base portion 1 and instead, the photo-interrupters 8 and 9 are fixed to the members 12A and 12B mounted on the base portion 1. This, however, is not an essential difference between the devices of FIGS. 1 and 16.

Further, an operation of detecting the position of the magnetic head 7 (hereunder referred to simply as a position detecting operation) in case of the position detecting device of FIG. 16 is the same as the above described position-detecting operation of the position detecting device of FIG. 1. Therefore, the detail description of the position detecting operation is omitted herein.

Similarly as in case of the position detecting device of FIG. 15, the photo-interrupters 8 and 9 are fixed to the base portion 1 by using fitting screws 10 and 11, respectively, in the position detecting device of FIG. 16 in such a manner that the direction, in which the displacement of the cases is caused due to the expansion or shrinkage, is in agreement with the direction along which edge portions of the protruding portions 6a and 6b extend.

Figure 17B:
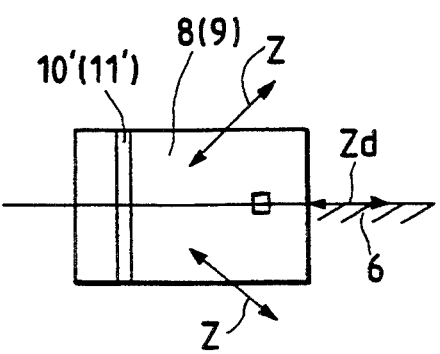
Figure 18A:
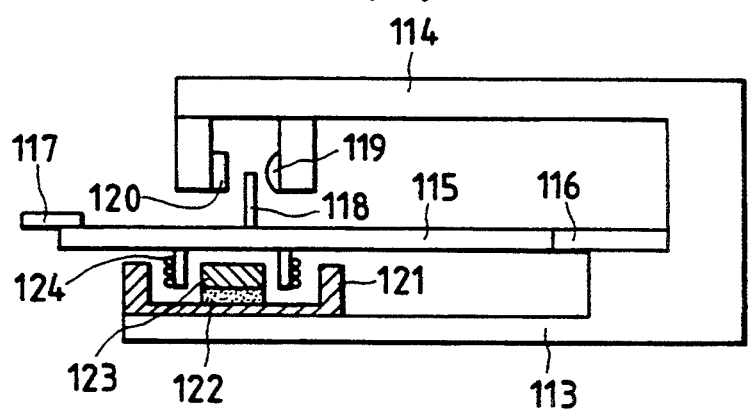
FIGS. 18(a) and 18(b) are diagrams for illustrating a conventional device for driving the position of a recording/reproducing element.
Figure 18B:
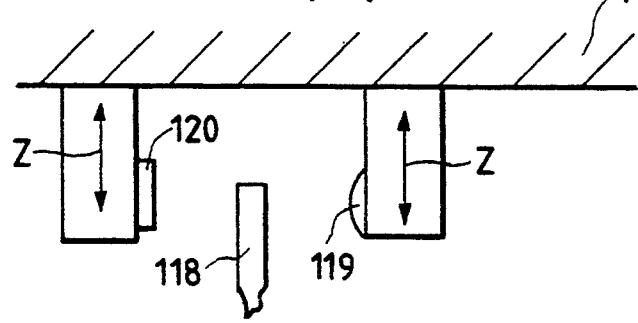

Similarly as in FIG. 17(a), arrows Z indicate the directions, in which the cases of the photo-interrupters 8 and 9 fixed to the base portion 1 in the similar manner expand or shrink due to environmental temperature, in FIG. 17(b). Further, similarly, reference character 10 designates a position at which the photo-interrupter 8 is fixed to the base portion 1 by using the screw 10; 11 designates a position at which the photo-interrupter 9 is fixed to the base portion 1 by using the screw 11; and $Z_d$ the direction in which the displacement of a case used for accommodating the fitting portions of the light emitting element and the light receiving element due to change in environmental temperature is effected. Therefore, in case of the position detecting device of FIG. 15 according to the present invention, even when the case accommodating the photo-interrupter 9 expand or shrink and thus displaces due to change in environmental temperature, the displacement of the cases has no effect on the result of a detection of the position of a magnetic head.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A device having a fixed portion for detecting the position of a recording/reproducing element, said device comprising:

a drive means having a moving portion and for driving the recording/reproducing element;

light shielding means having an edge portion and fixed to the moving portion of said drive means; and photo-interrupters each having a light emitting element and a light receiving element and rigidly mounted on said fixed portion in such a manner that the direction, in which each of said photo-interrupters expands or contracts owing to a heating or refrigerating thereof, is in agreement with a direction in which the edge portion of said light shielding means extends when said recording/reproducing element is at a reference position thereof, and for outputting a signal corresponding to the position of the recording/reproducing element correspondingly to the quantity of the displacement of the edge portion of said light shielding means when said light shielding means moves in an optical path from said light emitting element to said light receiving element, wherein each of said photo-interrupters is a transmission-type photosensor, said photo-interrupters and said light shielding means are disposed in a line, and said photo-interrupters and said recording/reproducing element are disposed in a line, and a direction of change in position of each of said light-shielding means and said photo-interrupters due to the expansion or contraction is normal to the direction of change in position of said moving portion, said recording/reproducing element is disposed at the center between said photo-interrupters, when said moving portion moves, change in a quantity of light received by a light receiving element of one of said photo-interrupters is complementary to change in a quantity of light received by a light receiving element of the other of said photo-interrupters, and the quantity of light received by the light receiving element of one of said photo-interrupters is equal to that of light received by the light receiving element of the other of said photo-interrupters when said recording/reproducing element is at the reference position thereof.

2. A device for detecting the position of a recording/reproducing element, said device comprising:

a drive device having a moving portion and for driving said recording/reproducing element;

first and second protruding portions provided at both sides of a part, on which said recording/reproducing element is mounted, of the moving portion of said drive device, each of said first and second protruding portion having two end surfaces, one of the two end surfaces of said first protruding portion and one of the two end surfaces of said second protruding portion being on a first plane, the other of the two end surfaces of said first protruding portion and that of the two end surfaces of said second protruding portion being at opposite sides of the first plane;

first and second position detecting elements having substantially the same input/output characteristics, the outputs of said first and second position detecting means changing corresponding to change in position of said recording/reproducing element in such a manner to be complementary to each other, said first and second position detecting elements and said recording/reproducing element being disposed in a line perpendicular to a direction of change in position of the moving portion, said first and second position detecting elements respectively corresponding to said first and second protruding portions, the center of said first position detecting element and that of said second position detecting element being on the first plane when said recording/reproducing element is at a predetermined reference position, said recording/reproducing element being disposed at the center between said first and second position detecting elements; and difference signal generating means for generating a difference signal representing the difference between output signals of said first and second position detecting elements, wherein said first and second position detecting elements are photo-interrupters, and wherein the first plane is perpendicular to the direction of change in position of the moving portion, wherein said first position detecting element has a first emitting element and a first light receiving element for receiving light emitted by said first light emitting element, said second position detecting element has a second light emitting element and a second light receiving element for receiving light emitted by said second light emitting element, change in a first quantity of light received by said first light receiving element and change in a second quantity of light received by said second light receiving element are complementary to each other, said difference signal generating means includes an operation amplifier for receiving first and second signals respectively corresponding to the first and second quantities and for outputting a difference signal corresponding to a difference between the first and second quantities, and said difference signal generating means further comprises a thermistor placed in neighborhood of said photo-interrupters.

3. A device for detecting the position of a recording/reproducing element, said device comprising:

a drive device having a moving portion and for driving said recording/reproducing element;

first and second protruding portions provided at both sides of a part, on which said recording/reproducing element is mounted, of the moving portion of said drive device, each of said first and second protruding portion having two end surfaces, one of the two end surfaces of said first protruding portion and one of the two end surfaces of said second protruding portion being on a first plane, the other of the two end surfaces of said first protruding portion and that of the two end surfaces of said second protruding portion being at opposite sides of the first plane;

first and second position detecting elements respectively corresponding to said first and second protruding portions, the center of said first position detecting element and that of said second position detecting element being on the first plane when said recording/reproducing element is at a predetermined reference position, said first and second position detecting elements and said recording/reproducing element being disposed in a line perpendicular to a direction of change in position of the moving portion, said recording/reproducing element being disposed at the center between said first and second position detecting elements; and difference signal generating means for generating a difference signal representing a difference between output signals respectively outputted from said first and second position detecting elements, wherein said first and second position detecting elements are photo-interrupters, and wherein the first plane is perpendicular to the direction of change in position of the moving portion, wherein said first position detecting element has a first emitting element and a first light receiving element for receiving light emitted by said first light emitting element, said second position detecting element has a second light emitting element and a second light receiving element for receiving light emitted by said second light emitting element, change in a first quantity of light received by said first light receiving element and change in a second quantity of light received by said second light receiving element are complementary to each other, said difference signal generating means includes an operation amplifier for receiving first and second signals respectively corresponding to the first and second quantities and for outputting a difference signal corresponding to a difference between the first and second quantities, and said difference signal generating means further comprises a thermistor placed in neighborhood of said photo-interrupters.

4. The device as set forth in claim 1, wherein said first position detecting element has a first emitting element and a first light receiving element for receiving light emitted by said first light emitting element, said second position detecting element has a second light emitting element and a second light receiving element for receiving light emitted by said second light emitting element, change in a first quantity of light received by said first light receiving element and change in a second quantity of light received by said second light receiving element are complementary to each other, said difference signal generating means includes an operation amplifier for receiving first and second signals respectively corresponding to the first and second quantities and for outputting a difference signal corresponding to a difference between the first and second quantities, and said difference signal generating means further comprises a thermistor placed in neighborhood of said photo-interrupters.

5. The device as set forth in claim 1 wherein when said recording/reproducing element is at the reference position thereof, an upper half of the light receiving element of one of said photo-interrupters and a lower half of the light receiving element of the other of said photo-interrupters are shielded from light by said light shielding means.

* * * * *